(12) United States Patent
Harada et al.

(10) Patent No.: US 11,545,712 B2
(45) Date of Patent: Jan. 3, 2023

(54) SHAPE CORRECTION DEVICE FOR FRAME BODY, AND METHOD FOR MANUFACTURING ELECTROLYTE FILM/ELECTRODE STRUCTURE PROVIDED WITH RESIN FRAME FOR FUEL CELL

(71) Applicant: HONDA MOTOR CO., LTD., Tokyo (JP)

(72) Inventors: Ken Harada, Tochigi-ken (JP); Satoshi Hasegawa, Tochigi-ken (JP); Sachio Suzuki, Tochigi-ken (JP); Kouya Shimada, Tochigi-ken (JP); Nobuyoshi Muromoto, Tochigi-ken (JP); Hiroshi Yoshioka, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 151 days.

(21) Appl. No.: 16/623,046

(22) PCT Filed: Jun. 19, 2018

(86) PCT No.: PCT/JP2018/023329
§ 371 (c)(1),
(2) Date: Dec. 16, 2019

(87) PCT Pub. No.: WO2018/235825
PCT Pub. Date: Dec. 27, 2018

(65) Prior Publication Data
US 2021/0151827 A1  May 20, 2021

(30) Foreign Application Priority Data
Jun. 22, 2017 (JP) .............................. JP2017-121971

(51) Int. Cl.
*H01M 50/202* (2021.01)
*H01M 8/0273* (2016.01)
(Continued)

(52) U.S. Cl.
CPC ............ *H01M 50/202* (2021.01); *B21D 3/14* (2013.01); *B21D 7/00* (2013.01); *H01M 8/0273* (2013.01)

(58) Field of Classification Search
CPC .......................... H01M 8/0273; H01M 8/0276
See application file for complete search history.

(56) References Cited

U.S. PATENT DOCUMENTS

| | | | |
|---|---|---|---|
| 7,910,037 B2 * | 3/2011 | Itoh ...................... | H01M 8/0258 264/297.8 |
| 9,991,546 B2 * | 6/2018 | Lee ........................ | H01M 8/248 |
| 2004/0234831 A1 * | 11/2004 | Kobayashi ............ | H01M 8/242 429/510 |

FOREIGN PATENT DOCUMENTS

| | | |
|---|---|---|
| JP | 09-047819 | 2/1997 |
| JP | 2002-263737 | 9/2002 |
| JP | 2016-081566 | 5/2016 |

OTHER PUBLICATIONS

International Search Report and Written Opinion for International Application No. PCT/JP2018/023329 dated Aug. 14, 2018, 11 pages.

* cited by examiner

*Primary Examiner* — Maria Laios
*Assistant Examiner* — Jordan E Berresford
(74) *Attorney, Agent, or Firm* — Amin, Turocy & Watson, LLP

(57) ABSTRACT

The present invention relates to: a shape correction device for a frame body; and a method for manufacturing an electrolyte film/electrode structure that is provided with a resin frame for a fuel cell. A shape correction device, which corrects the shape of a frame body that is provided with a rectangular opening, is equipped with a pressing mechanism that applies, to each side of the frame body, a pressing force (Continued)

directed from the inner side to the outer side of the opening. The pressing mechanism may have a first bar and a second bar, which apply the pressing force by being in contact with inner wall surfaces of each side of the frame body.

2 Claims, 23 Drawing Sheets

(51) Int. Cl.
*B21D 3/14* (2006.01)
*B21D 7/00* (2006.01)

SHAPE CORRECTION DEVICE FOR FRAME BODY, AND METHOD FOR MANUFACTURING ELECTROLYTE FILM/ELECTRODE STRUCTURE PROVIDED WITH RESIN FRAME FOR FUEL CELL

TECHNICAL FIELD

The present invention relates to a shape correction apparatus (device) for a frame body having a rectangular opening, and a method of producing a fuel cell resin frame equipped membrane electrode assembly (method for manufacturing an electrolyte film/electrode structure provided with a resin frame for a fuel cell) formed by joining a resin frame body having a rectangular opening and a membrane electrode assembly together.

BACKGROUND ART

For example, a fuel cell resin frame equipped membrane electrode assembly as described in Japanese Laid-Open Patent Publication No. 2016-081566 is known. The fuel cell resin frame equipped membrane electrode assembly includes a membrane electrode assembly including a solid polymer electrolyte membrane and electrodes on both sides of the solid polymer electrolyte membrane, and a resin frame body provided around outer periphery of the membrane electrode assembly. A rectangular opening is provided in the frame body, and a peripheral portion of the opening is joined to an outer peripheral portion of the membrane electrode assembly.

SUMMARY OF INVENTION

In the above frame body, strain may be generated due to variation in production, etc. In the state where strain is generated in the frame body, it becomes difficult to join the frame body to a joining target such as a membrane electrode assembly. Further, even if the frame body is joined successfully, there is a concern that the resulting joint body may not satisfy the desired dimensional accuracy.

A main object of the present invention is to provide a shape correction apparatus for a frame body capable of correcting the shape of the frame body suitably.

Another object of the present invention is to provide a method of producing a fuel cell resin frame equipped membrane electrode assembly by which it is possible to obtain the fuel cell resin frame equipped membrane electrode assembly having good dimensional accuracy.

According to one embodiment of the present invention, provided is a shape correction apparatus for a frame body having a rectangular opening, the shape correction apparatus including a pressing mechanism configured to apply a pressing force oriented from an inside to an outside of the opening to each of sides of the frame body.

In this shape correction apparatus, by applying the pressing force oriented from the inside to the outside of the opening to each of the sides of the frame body, even in the case where strain has been generated in the frame body due to production variation, etc., it is possible to suitably correct the shape of the frame body.

In the above shape correction apparatus for the frame body, preferably, the pressing mechanism includes a bar configured to contact an inner wall surface of each of the sides of the frame body, and apply the pressing force to the inner wall surface. In this case, with simple structure, it becomes possible to apply the pressing force to the frame body effectively.

In the above shape correction apparatus for the frame body, preferably, the bar has a bent shape which becomes separated from the inner wall surface, from both ends toward a center of the bar, and the bar is deformable in a manner that the bar has a straight shape along the inner wall surface when the pressing force reaches a predetermined magnitude.

For example, the measurement value of the pressing force applied to the frame body can be determined from the deformation amount (strain amount) of the bar which is brought into contact with the frame body. Therefore, in order to measure the pressing force with sufficient accuracy, it is required to reduce the rigidity of the bar to make the bar deformable easily. However, if the rigidity of the bar is reduced, it becomes difficult for the bar to apply, to the frame body, the pressing force sufficient to correct the shape of the frame body, and it becomes difficult to correct the shape of the frame body to the target shape.

Therefore, the bar is formed to have the above curved shape beforehand. In this manner, it becomes possible to change the shape of the bar after deforming by contact with the frame body, to the target shape of the frame body. That is, by applying the pressing force while deforming the bar, and measuring the magnitude of the pressing force highly accurately, it is possible to correct the shape of the frame body which contacts the bar after deformation.

In the above shape correction apparatus for the frame body, preferably, the pressing mechanism is configured to apply the pressing force to a short side and a long side of the frame body at timings different from each other. As described above, in the case of applying the pressing force using the bar, in order to simultaneously apply the pressing force to the four sides of the frame body, complicated control is required such as moving the bar which contacts the long side and moving the bar which contacts the short side in different directions, respectively, to bring these bars into contact with the frame body at the same timing. As a result, there is a concern that operation errors of the pressing mechanism occur easily, and the correction accuracy for the frame body is lowered.

Preferably, in order to suppress such operation errors of the pressing mechanism, after the pressing force is applied to the two short sides or the two long sides, and then, the pressing force is applied to the other two sides. In this manner, in comparison with the case of simultaneously applying the pressing force to the four sides, it is possible to improve the correction accuracy for the frame body easily.

In the above shape correction apparatus for the frame body, preferably, the pressing mechanism is configured to apply the pressing force to the short side of the frame body and the long side of the frame body in this order. In this regard, since the long sides are longer than the short sides, the deformation amount in deformation of the long sides by correction tends to be large. The friction force generated between the bars and the long sides when the long sides are pressed by the bars for correction tends to be larger than the friction force generated between the bars and the short sides when the short sides are pressed by the bars for correction.

Therefore, in particular, in the case where a relatively large friction force is generated between the bars and the frame body, the pressing force should be applied to the short sides having the smaller deformation amount as described above. It is because, since the friction force between the short sides and the bars is small, it is possible to deform the long sides easily. As a result, it is becomes possible to correct the shape of the frame body with a higher degree of accuracy by suitably deforming both of the short sides and the long sides into the target shapes.

In the above shape correction apparatus for the frame body, preferably, the shape correction apparatus further includes a frame body holder configured to hold an outer peripheral side of the frame body in a thickness direction, in a state where the pressing force is applied to the frame body by the pressing mechanism. In this case, the shape of the frame body corrected by the pressing mechanism can be maintained by the frame body holder suitably.

In the above shape correction apparatus for the frame body, preferably, the frame body is provided with a frame body side engagement portion, the frame body holder is provided with a holder side engagement portion configured to be engaged with the frame body side engagement portion, and when the frame body is held by the frame body holder, the holder side engagement portion and the frame body side engagement portion are engaged with each other to restrict relative movement of the frame body at least toward an inner peripheral side of the frame body holder.

The frame body held by the frame body holder may be pulled toward the inner peripheral side of the frame body holder, or deformed elastically, through the peripheral portion of the opening of the frame body exposed from the frame body holder. That is, against the force of holding the frame body by the frame body holder, a force of moving the frame body toward the inner peripheral side of the frame body holder may be generated. Also in this case, by engagement between the holder side engagement portion and the frame body side engagement portion, it is possible to restrict relative movement of the frame body. Therefore, it becomes possible to further suitably maintain the shape of the frame body corrected by the pressing mechanism, by the frame body holder.

In the above shape correction apparatus for the frame body, preferably, the frame body side engagement portion is a protrusion protruding from the frame body in the thickness direction, and the holder side engagement portion is a recess configured to accommodate the frame body side engagement portion. In this case, the holder side engagement portion and the frame body side engagement portion can have simple structure. Further, in the case of holding the frame body by the frame body holder, it is possible to bring the frame body side engagement portion and the holder side engagement portion into engagement with each other easily.

In the above shape correction apparatus for the frame body, preferably, the holder side engagement portion is in a form of a groove extending in at least one of the long side and the short side of the frame body when the frame body is held by the frame body holder. In this case, since the holder side engagement portion and the frame body side engagement portion can be engaged with each other easily and suitably, it becomes possible to effectively maintain the shape of the frame body by the frame body holder.

In the above shape correction apparatus for the frame body, preferably, the frame body holder is provided with the holder side engagement portion at a position that faces the long side of the frame body when the frame body holder holds the frame body. In this case, although the long side is longer than the short side of the frame body and tends to be deformed easily, it is possible to suppress relative movement of the long side with respect to the frame body holder. Therefore, it becomes possible to maintain the shape of the frame body by the frame body holder effectively.

According to another embodiment of the present invention, provided is a method of producing a fuel cell resin frame equipped membrane electrode assembly, the fuel cell resin frame equipped membrane electrode assembly including a membrane electrode assembly including a solid polymer electrolyte membrane and electrodes provided on both sides of the solid polymer electrolyte membrane, and a resin frame body having a rectangular opening, an outer peripheral portion of the membrane electrode assembly and a peripheral portion of the rectangular opening being joined together, the method including a correcting step of correcting a shape of the frame body by applying a pressing force oriented from an inside to an outside of the opening by a pressing mechanism, a maintaining step of maintaining the corrected shape of the frame body by a frame body holder configured to hold an outer peripheral side of the frame body in a thickness direction, and a joining step of, in a state where the frame body is held by the frame body holder, joining the peripheral portion of the opening and the outer peripheral portion of the membrane electrode assembly.

In the method of producing the fuel cell resin frame equipped membrane electrode assembly, in the correcting step, by applying the pressing force oriented from the inside to the outside of the opening to each of the sides of the frame body, even in the case where strain has been generated in the frame body due to production variation, etc., it is possible to suitably correct the shape of the frame body. After the shape of the frame body is corrected, the frame body is held by the frame body holder in the thickness direction. In this manner, it is possible to easily maintain the state where the shape of the frame body holder is corrected. Therefore, the frame body held by the frame body holder and the membrane electrode assembly are positioned in alignment with each other, and the peripheral portion of the opening of the frame body and the outer peripheral portion of the membrane electrode assembly are joined together, whereby it is possible to obtain the fuel cell resin frame equipped membrane electrode assembly having excellent dimensional accuracy.

In the above method of producing the fuel cell resin frame equipped membrane electrode assembly, preferably, in the correcting step, firstly, the pressing force is applied to any one of a short side and a long side of the frame body, and then the pressing force is applied also to another of the short side and the long side of the frame body. In this case, it is possible to reduce the operation errors of the pressing mechanism and improve the correction accuracy for the frame body easily in comparison with the case of simultaneously applying the pressing force to the four sides of the frame body.

In the above method of producing the fuel cell resin frame equipped membrane electrode assembly, preferably, in the correcting step, firstly, the pressing force is applied to only the short side of the frame body, and then the pressing force is applied also to the long side the frame body. In this case, by suitably deforming both of the short side and the long side into the target shapes, it is becomes possible to correct the shape of the frame body with a higher degree of accuracy.

In the above method of producing the fuel cell resin frame equipped membrane electrode assembly, preferably, the maintaining step is performed while the frame body is held by the frame body holder in a manner that a holder side engagement portion provided in the frame body holder is engaged with a frame body side engagement portion provided in the frame body, to perform the joining step in a state where relative movement of the frame body at least toward the inner peripheral side of the frame body holder is restricted.

In this case, for example, in the joining step, even in the case where a force of pulling the frame body toward the inner peripheral side is applied against the force of holding the frame body by the frame body holder, since the frame body side engagement part and the holder side engagement portion are engaged with each other, relative movement of the frame body with respect to the frame body holder is restricted. Therefore, it is possible to join the peripheral portion of the opening of the frame body and the outer peripheral portion of the membrane electrode assembly together while more suitably maintaining, by the frame body holder, the shape of the frame body corrected in the correcting step. As a result, it becomes possible to obtain the fuel cell resin frame equipped membrane electrode assembly with a higher degree of the dimensional accuracy.

In the above method of producing the fuel cell resin frame equipped membrane electrode assembly, preferably, in the maintaining step, the frame body side engagement portion in a form of a protrusion is engaged with the holder side engagement portion in a form of a recess. In this case, in the maintaining step, by bringing the holder side engagement portion and the frame body side engagement portion both having simple structure into engagement with each other, it is possible to restrict relative movement of the frame body and the frame body holder.

In the above method of producing the fuel cell resin frame equipped membrane electrode assembly, preferably, in the maintaining step, the frame body side engagement portion in a form of a ridge extending along at least the long side of the frame body is brought into engagement with the holder side engagement portion in a form of a groove configured to accommodate the frame body side engagement portion. In this case, it is possible to bring the holder side engagement portion and the frame body side engagement portion into engagement with each other easily and suitably. Further, by forming the frame body side engagement portion in the form of the ridge, it is possible to effectively suppress relative movement of the long side of the frame body which tends to be deformed easily, with respect to the frame body holder. Accordingly, it becomes possible to maintain the shape of the frame body suitably.

In the above method of producing the fuel cell resin frame equipped membrane electrode assembly, preferably, the method further includes an impregnation joining step of, after the joining step, releasing holding of the frame body by the frame body holder, melting an impregnation protrusion provided in the frame body on a side closer to the opening than the frame body side engagement portion to form molten resin, and impregnating the outer peripheral portion of the membrane electrode assembly with the molten resin to form an impregnation joint portion while restricting flow of the molten resin toward the outer peripheral side of the frame body by the frame body side engagement portion.

For example, the frame body is provided with the frame body side engagement portion beforehand in order to restrict movement of the molten resin, and the frame body holder is provided with the holder side engagement portion beforehand in order to avoid interference between the frame body engagement portion and the frame body holder. By utilizing the existing frame body side engagement portion and the existing holder side engagement portion as they are in this manner, or utilizing the frame body side engagement portion and the holder side engagement portion after suitably setting the dimensions thereof, it is possible to restrict relative movement of the frame body toward the inner peripheral side of the frame body holder easily at low cost. Further, even if deformation, etc. occurs in the frame body side engagement portion by the load applied during engagement with the holder side engagement portion, there is no concern that the dimensional accuracy or the quality of the fuel cell resin frame equipped membrane electrode assembly is affected. Therefore, it is possible to effectively improve the dimensional accuracy of the fuel cell resin frame equipped membrane electrode assembly in simple steps.

DESCRIPTION OF EMBODIMENTS

Figure 1:
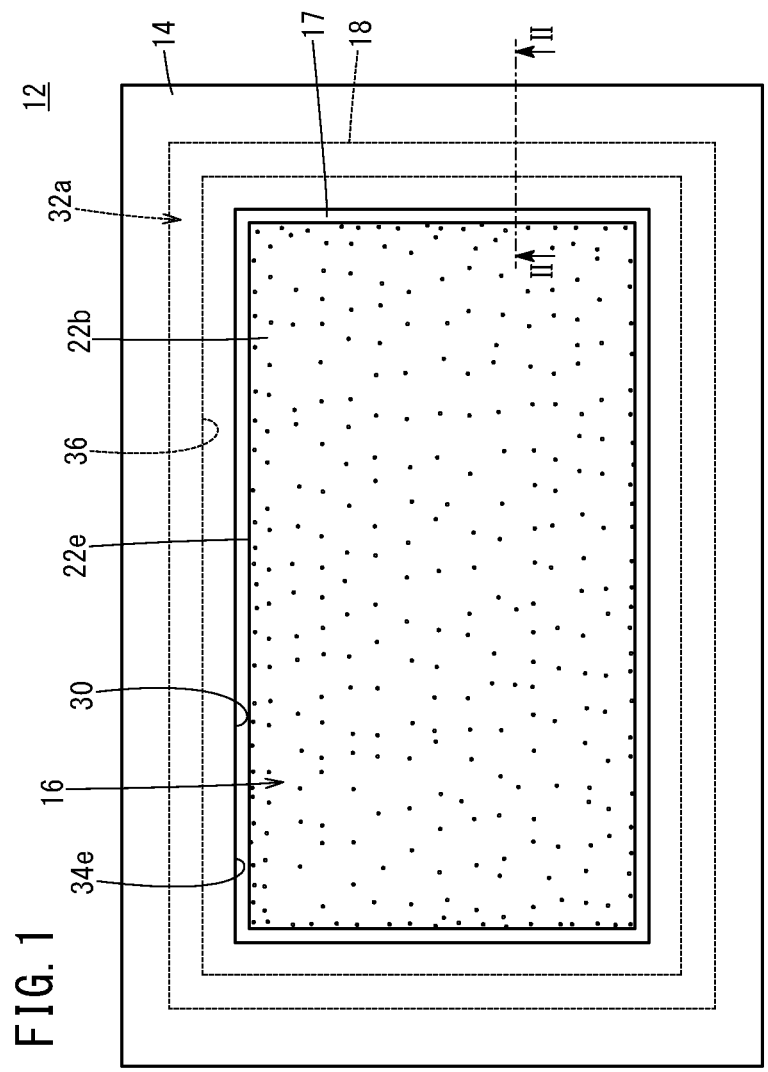
FIG. 1 is a schematic plan view showing a fuel cell resin frame equipped membrane electrode assembly obtained by applying a method of producing the fuel cell resin frame equipped membrane electrode assembly according to a first embodiment of the present invention.

Preferred embodiments of a shape correction apparatus for a frame body, and a method of producing a fuel cell resin frame equipped membrane electrode assembly will be described in detail with reference to the accompanying drawings. In the following drawings, the constituent elements that offer the same or similar functions and advantages are labeled with the same reference numerals, and such constituent elements may not be described repeatedly.

In a first embodiment, a method of producing a fuel cell resin frame equipped membrane electrode assembly (hereinafter also referred to as a "resin frame equipped MEA") 12 (see FIG. 1), using an apparatus for correcting the shape of a frame body (hereinafter also simply referred to as a "shape correction apparatus") 10 (see FIG. 8A) will be described. That is, the shape correction apparatus 10 is applied to the case of correcting the shape of a resin frame body 14 of the resin frame equipped MEA 12. However, the shape correction apparatus 10 is not used only for the above frame body 14, but can be used for frame bodies of various applications and types as long as the frame bodies have rectangular openings.

Firstly, the resin frame equipped MEA 12 will be described with reference to FIGS. 1 to 3. The resin frame equipped MEA 12 includes a membrane electrode assembly (hereinafter also referred to as the "MEA") 16 and the frame body 14 joined to an outer peripheral portion of the MEA 16 through adhesive 17. The adhesive 17 is not limited specially, to liquid or solid adhesive, thermoplastic or thermosetting adhesive, etc. As the adhesive 17, for example, liquid seal or a hot melt agent may be used.

Figure 2:
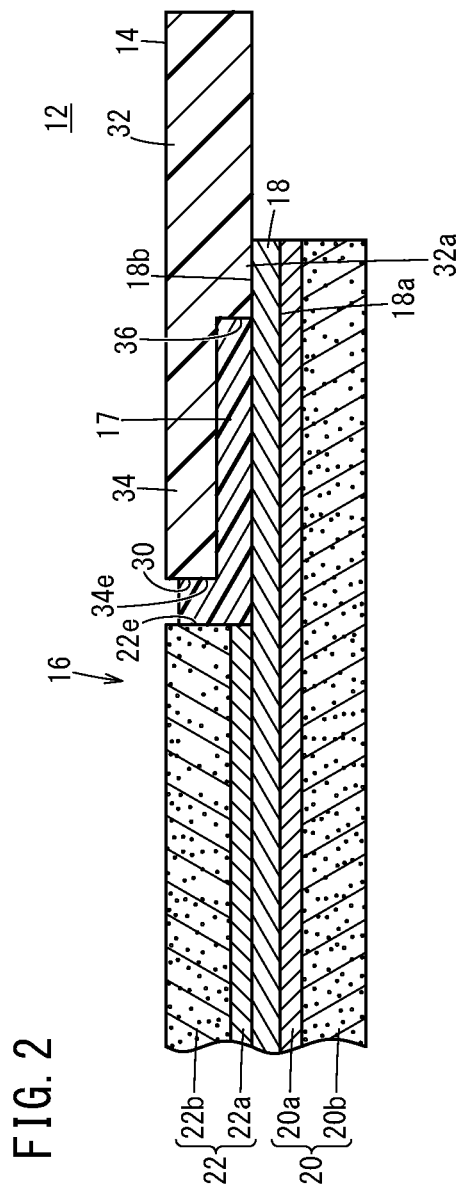
FIG. 2 is a cross sectional view taken along an arrow II-II in FIG. 1.

As shown in FIG. 2, the MEA 16 includes a solid polymer electrolyte membrane (cation ion exchange membrane) 18 and an anode 20 and a cathode 22. For example, the solid polymer electrolyte membrane 18 is a thin membrane of perfluorosulfonic acid containing water. The solid polymer electrolyte membrane 18 is interposed between the anode 20 and the cathode 22. As the solid polymer electrolyte membrane 18, an HC (hydrocarbon) based electrolyte may be used in addition to a fluorine based electrolyte.

The anode 20 includes a first electrode catalyst layer 20a joined to one surface 18a of the solid polymer electrolyte membrane 18, and a first gas diffusion layer 20b stacked on the first electrode catalyst layer 20a. The surface size of the first electrode catalyst layer 20a is the same as the surface size of the first gas diffusion layer 20b, and the same as, or smaller than the surface size of the solid polymer electrolyte membrane 18.

The cathode 22 includes a second electrode catalyst layer 22a joined to a surface 18b of the solid polymer electrolyte membrane 18, and a second gas diffusion layer 22b stacked on the second electrode catalyst layer 22a. The second electrode catalyst layer 22a and the second gas diffusion layer 22b have the same outer size. It should be noted that the surface size of the second electrode catalyst layer 22a may be larger than (or smaller than) the surface size of the second gas diffusion layer 22b.

Further, the surface size (outer size) of the cathode 22 is smaller than the surface sizes (outer sizes) of the solid polymer electrolyte membrane 18 and the anode 20. That is, in the embodiment of the present invention, the MEA 16 has different sizes of components. Instead of adopting the above structure, the surface size of the anode 20 may be smaller than the surface sizes of the solid polymer electrolyte membrane 18 and the cathode 22.

The first electrode catalyst layer 20a is formed by porous carbon particles deposited uniformly on the surface of the first gas diffusion layer 20b, platinum alloy being supported on the surfaces of the porous carbon particles. For example, the first gas diffusion layer 20b is formed of carbon paper, carbon cloth, etc. The second electrode catalyst layer 22a is formed by porous carbon particles deposited uniformly on the surface of the second gas diffusion layer 22b, platinum alloy being supported on the surfaces of the porous carbon particles. For example, the second gas diffusion layer 22b is formed of carbon paper, carbon cloth, etc.

Figure 3:
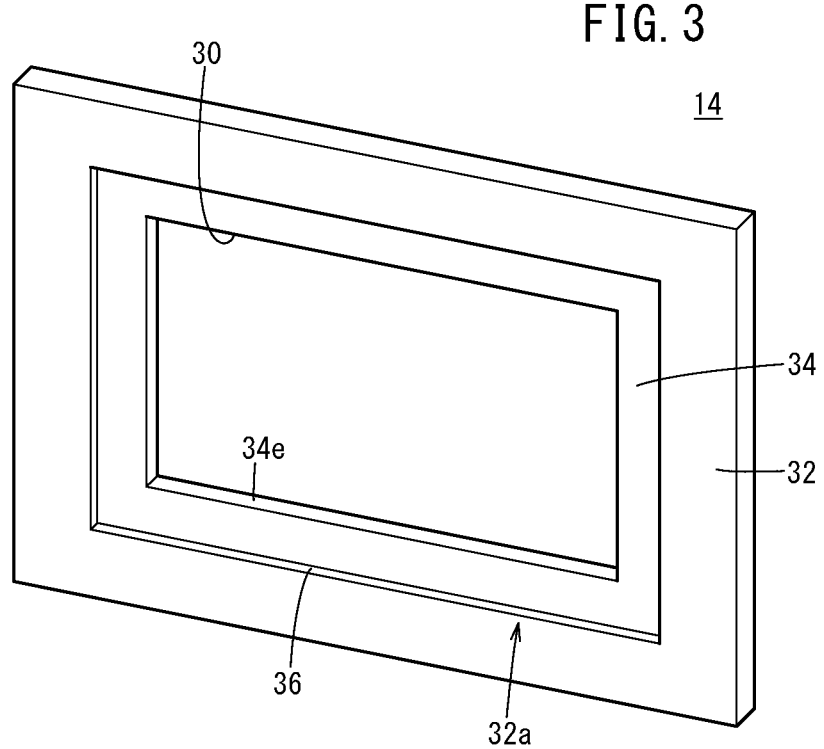
FIG. 3 is a perspective view showing a frame body of a fuel cell resin frame equipped membrane electrode assembly in FIG. 1.

As shown in FIGS. 1 to 3, the frame body 14 is made of resin, and a rectangular opening 30 is provided at substantially the center of the frame body 14. The resin frame body 14 can be obtained by molding using a die (not shown). There is a concern that strain may be generated in the frame body 14 at the time of removing the frame body 14 from the die, or at the time of changing the temperature of the frame body 14, e.g., from high temperature at which the frame body 14 is molded to normal temperature.

Examples of resin of the frame body 14 include PPS (polyphenylene sulfide), PPA (polyphthalamide), PEN (polyethylene naphthalate), PES (polyethersulfone), LCP (liquid crystal polymer), PVDF (polyvinylidene fluoride), a silicone rubber, a fluoro rubber, EPDM (ethylene propylene rubber), m-PPE (modified polyphenylene ether) resin, PET (polyethylene terephthalate), PBT (polybutylene terephthalate), or modified polyolefin.

As shown in FIGS. 2 and 3, a thick part 32 is provided in an outer peripheral portion of the frame body 14, and a thin part 34 which is thinner than the thick part 32 is provided in an inner peripheral portion of the frame body 14 (peripheral portion of the opening 30). In the structure, a step 36 is formed between the thick part 32 and the thin part 34.

As shown in FIG. 2, a stack portion 32a stacked on the surface 18b of the solid polymer electrolyte membrane 18 is provided in an outer peripheral portion of the step 36 of the thick part 32. When the solid polymer electrolyte membrane 18 and the stack portion 32a are stacked together, a space is formed between the thin part 34 and the surface 18b by the step 36. By filling the space with the adhesive 17, the frame body 14 and the MEA 16 are joined together. In terms of increasing the joining force between the frame body 14 and the MEA 16, preferably, the adhesive 17 may be present also between an end surface 34e of the thin part 34 of the frame body 14 (inner wall surface of the opening 30) and an end surface 22e of the cathode 22 (end surfaces of the second electrode catalyst layer 22a and the second gas diffusion layer 22b) facing and spaced from the end surface 34e.

Figure 8A:
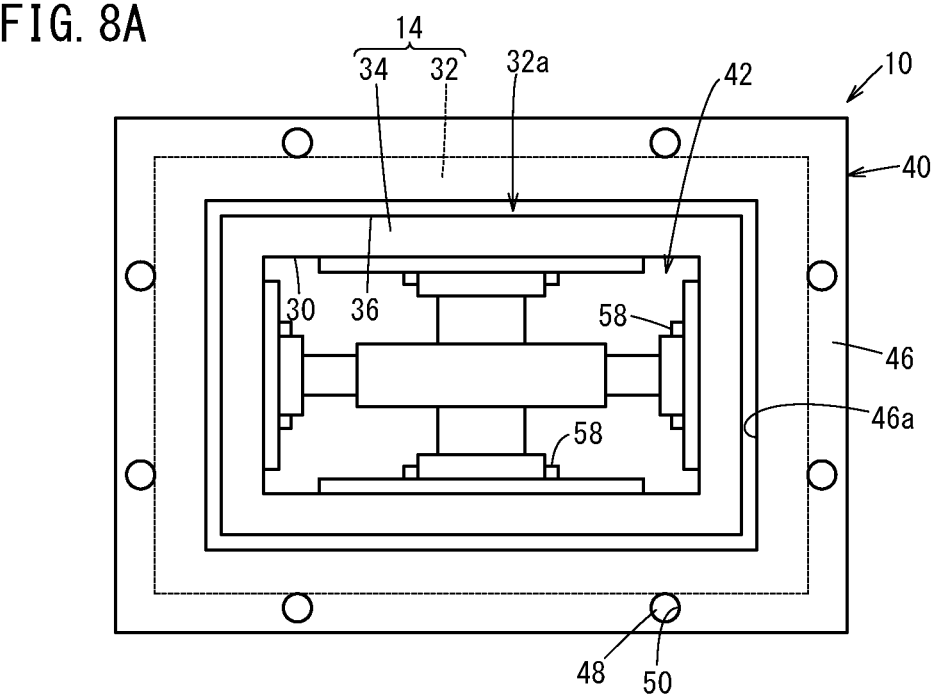
FIG. 8A is a plan view showing a state where a second holder is stacked on the first holder in FIG. 7 to hold the frame body.
Figure 8B:
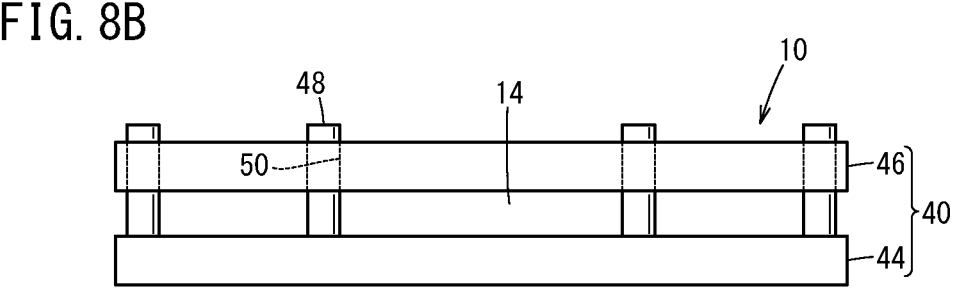
FIG. 8B is a side view of FIG. 8A.

The resin frame equipped MEA 12 according to the embodiment of the present invention basically has the above structure. Next, the shape correction apparatus 10 used at the time of producing the resin frame equipped MEA 12 will be described below. As shown in FIGS. 8A and 8B, the shape correction apparatus 10 includes a frame body holder 40 and a pressing mechanism 42.

Figure 9:
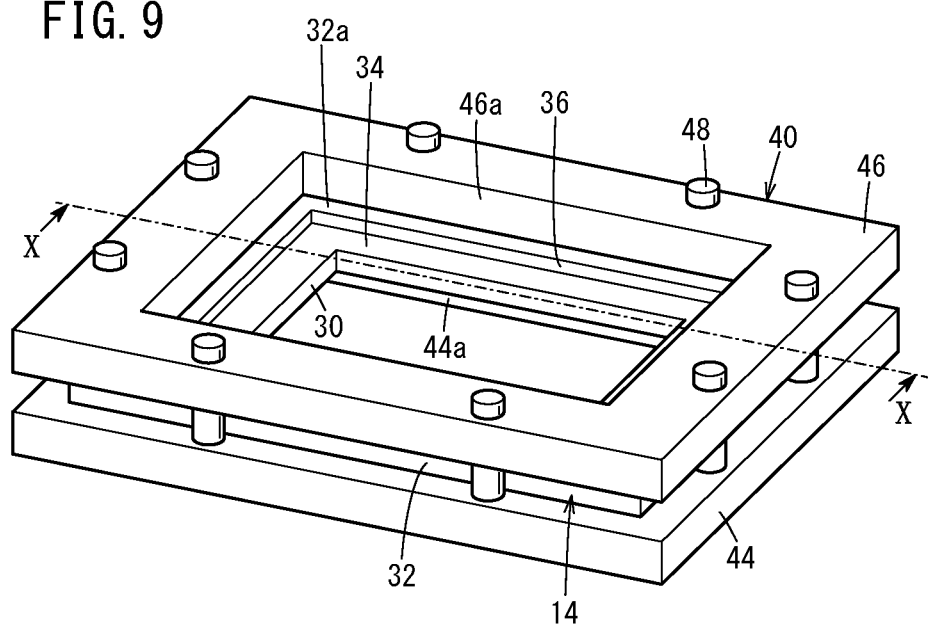
FIG. 9 is a perspective view showing a state where the pressing mechanism is removed from the frame body in FIG. 8A.

The frame body holder 40 includes a first holder 44 and a second holder 46 having frame shapes capable of holding the outer peripheral portion of the frame body 14 therebetween in the thickness direction of the frame body 14. As shown in FIG. 9, openings 44a, 46a are provided at substantially the central portions of the first holder 44 and the second holder 46. The openings 44a, 46a expose, from the first holder 44 and the second holder 46, the frame body 14 further on the inner peripheral portion side than the stack portion 32a.

Figure 4:
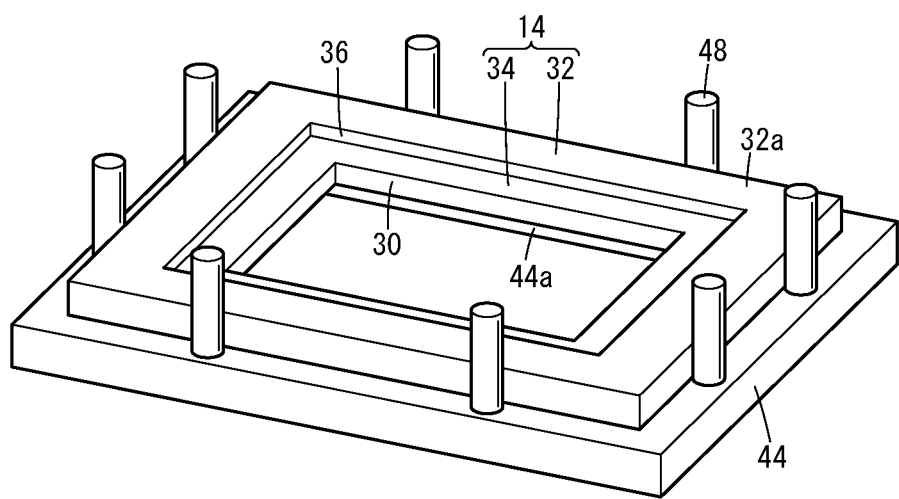
FIG. 4 is a perspective view showing a state where the frame body in FIG. 3 is placed on a first holder of a shape correction apparatus for the frame body according to the first embodiment of the present invention.

A plurality of pins 48 protruding in the thickness direction of the first holder 44 are provided in the first holder 44. As shown in FIG. 4, the pins 48 are provided so that, when the frame body 14 is set to the first holder 44, the pins 48 contact the end surface of the frame body 14 at positions on the outer peripheral portion and can correct the outer peripheral shape of the frame body 14.

As shown in FIGS. 8A and 8B, the second holder 46 is stacked on the first holder 44 in a manner that the frame body 14 is held between the first holder 44 and the second holder 46. The pins 48 protruding from the first holder 44 are inserted into a plurality of pin holes 50 formed in the second holder 46, respectively.

Figure 5:
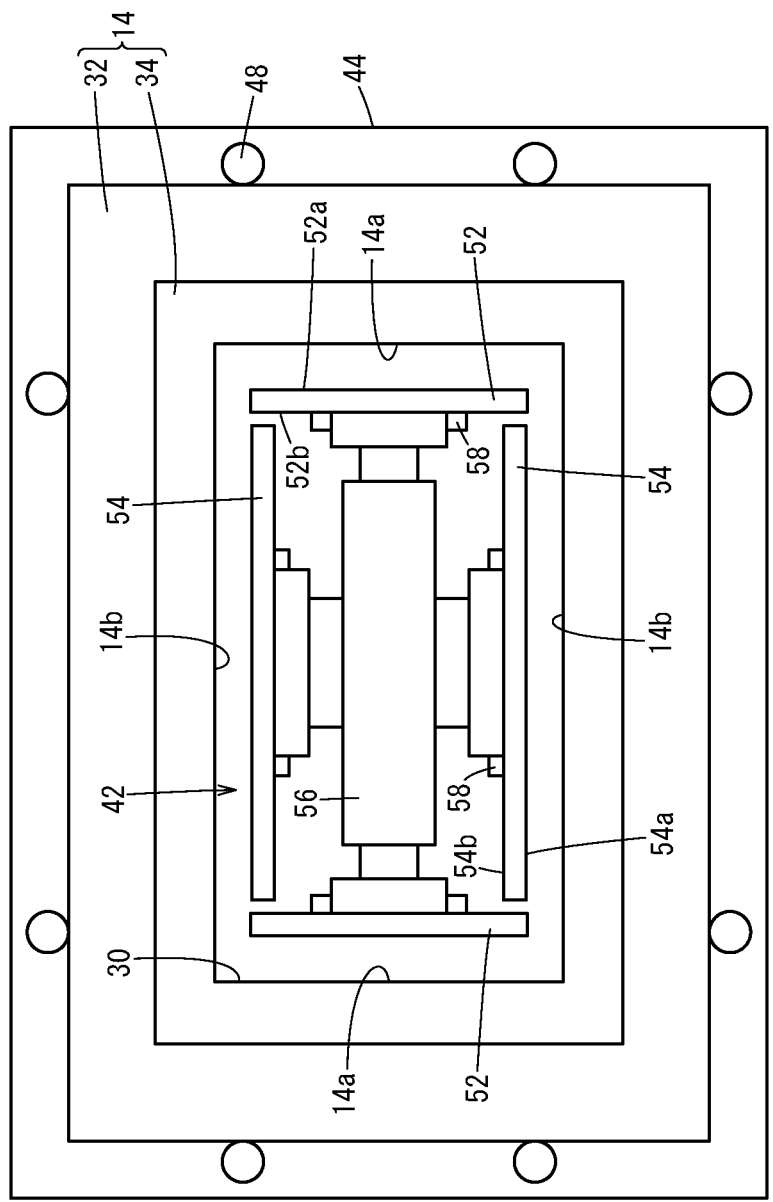
FIG. 5 is a plan view showing a state where a pressing mechanism is set in an opening of the frame body in FIG. 4.

As shown in FIG. 5, etc., the pressing mechanism 42 is provided detachably inside the opening 30 of the frame body 14, and applies a pressing force oriented from the inside to the outside of the opening 30 (hereinafter simply referred to as the "pressing force") to each of the sides of the frame body 14. Specifically, the pressing mechanism 42 includes first bars 52 and second bars 54 (hereinafter also referred to as the "bars" collectively), drive means 56, and load measuring means 58.

The first bars 52 are formed of a pair of bars respectively extending straight and having the length corresponding to the short sides of the frame body 14. The pair of first bars 52 have contact surfaces 52a capable of contacting inner wall surfaces 14a of the short sides of the frame body 14, respectively. Further, the second bars 54 are formed of a pair of bars respectively extending straight and having the length corresponding to the long sides of the frame body 14. The pair of second bars 54 have contact surfaces 54a capable of contacting inner wall surfaces 14b of the long sides of the frame body 14.

For example, the drive means 56 is formed of a cylinder, etc., and one end of the drive means 56 is attached to attachment surfaces 52b, 54b of the first bars 52 and the second bars 54, on the side opposite to the contact surfaces 52a, 54a. Therefore, the drive means 56 drives the first bars 52 in a direction toward or away from the inner wall surfaces 14a of the short sides of the frame body 14, and drives the second bars 54 in a direction toward or away from the inner wall surfaces 14b of the long sides of the frame body 14. Further, the drive means 56 can drive the first bars 52 and the second bars 54 independently, and can apply a pressing force to the short sides and the long sides of the frame body 14 at timings different from each other.

For example, the load measuring means 58 is formed of a strain gauge, etc., adhered to the respective attachment surfaces 52b, 54b of the first bars 52 and the second bars 54. The load measuring means 58 can detect the deformation amount (strain) when the first bars 52 and the second bars 54 are brought into contact with the inner wall surfaces 14a, 14b of the frame body 14. Based on the deformation amount, it is possible to obtain the measurement value of the pressing force (load) applied to the frame body 14.

The shape correction apparatus 10 according to the first embodiment basically has the above structure. Next, a method of producing the resin frame equipped MEA 12 using the shape correction apparatus 10 will be described.

Firstly, as shown in FIG. 4, the frame body 14 is placed on the first holder 44. As a result, part of the frame body 14 on the outer peripheral side of the stack portion 32a is stacked on the first holder 44, and the end surface of the frame body 14 on the outer peripheral portion side is brought into contact with the pins 48.

Next, as shown in FIG. 5, the pressing mechanism 42 is placed inside the opening 30 of the frame body 14. At this time, in the pressing mechanism 42, the first bars 52 and the second bars 54 are spaced from the inner wall surfaces 14a, 14b of the frame body 14, respectively, by the drive means 56.

Figure 6:
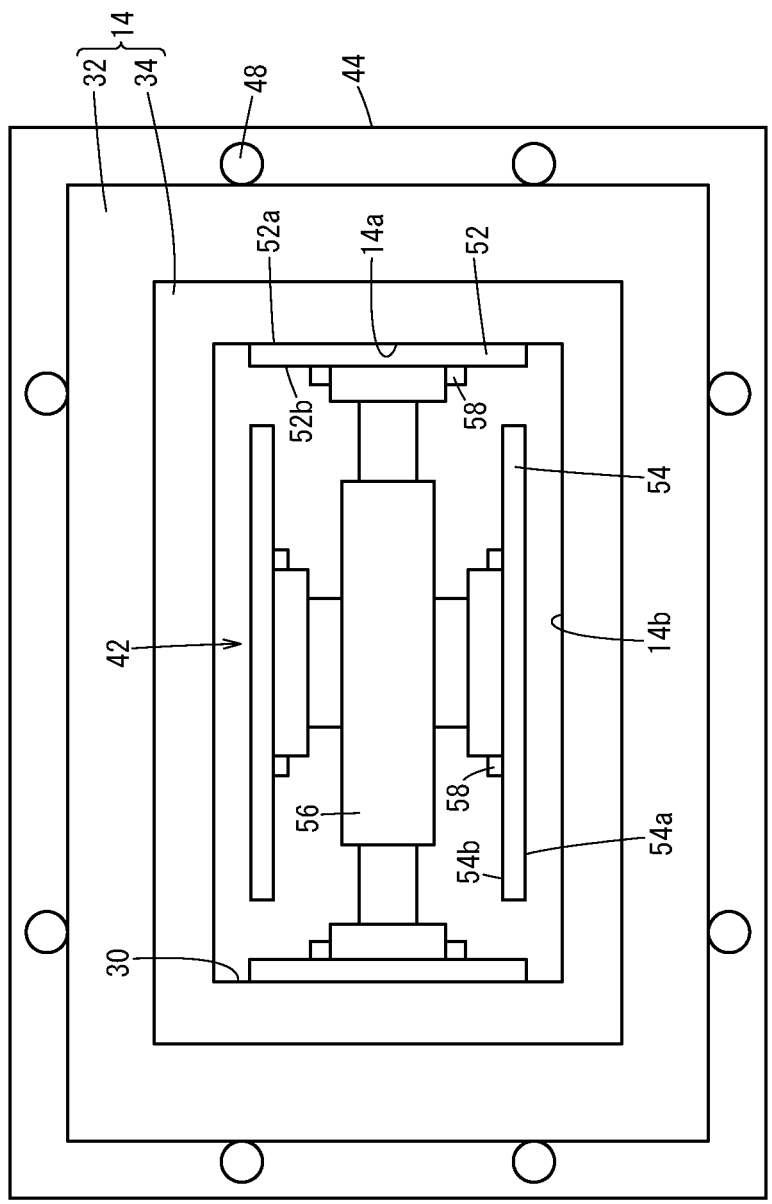
FIG. 6 is a plan view showing a state where a pressing force is applied to the short sides of the frame body by the pressing mechanism in FIG. 5.

Next, a correcting step of correcting the shape of the frame body 14 is performed by applying the pressing force oriented from the inside to the outside of the opening 30 to each of the sides of the frame body 14 by the pressing mechanism 42. Specifically, firstly, as shown in FIG. 6, by the drive means 56, the pair of first bars 52 are brought into contact with the inner wall surfaces 14a of the short sides of the frame body 14 to drive the first bars 52 in a direction in which the pressing force is increased.

Further, in the state where the measurement value of the pressing force measured by the load measuring means 58 reaches a magnitude where the shape of the frame body 14 is determined to be corrected into a target shape (hereinafter also referred to the "target value"), further driving of the first bars 52 by the drive means 56 is stopped. In this manner, it is possible to maintain the state where the pressing force having the target value is applied to the short sides of the frame body 14.

Figure 7:
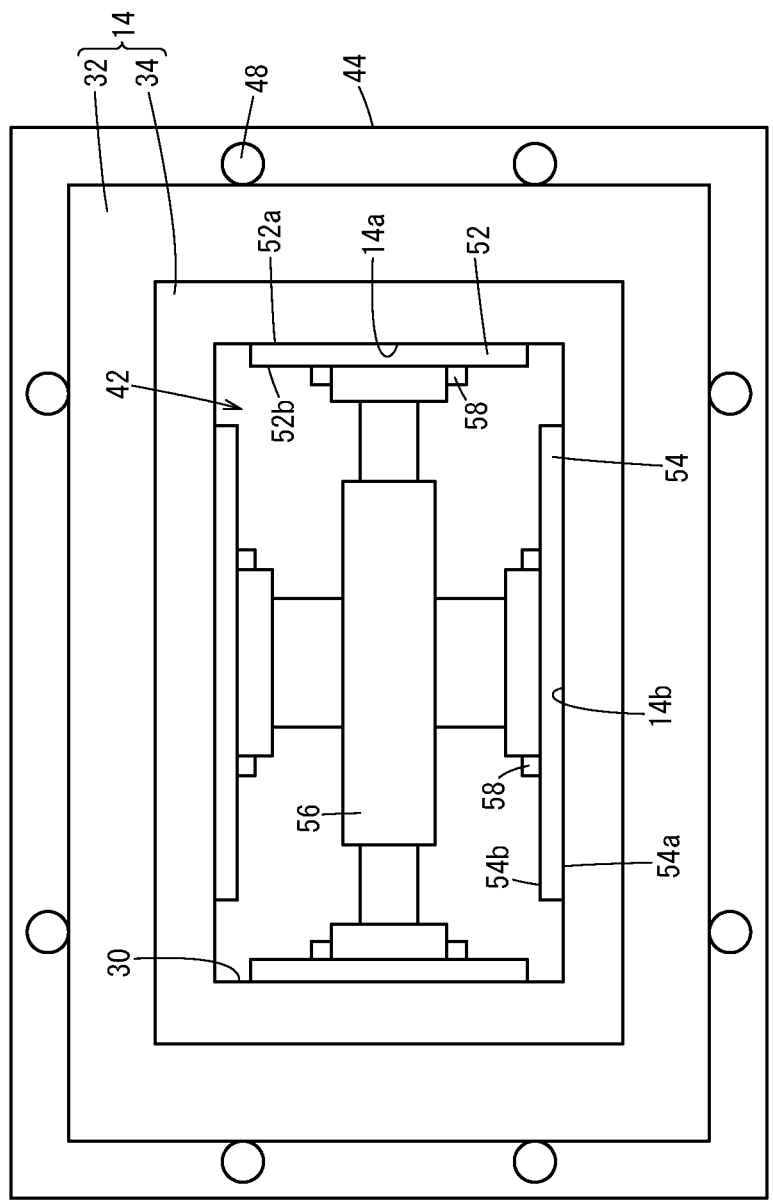
FIG. 7 is a plan view showing the state where a pressing force is applied also to the long sides of the frame body by the pressing mechanism in FIG. 6.

Next, as shown in FIG. 7, by the drive means 56, the pair of second bars 54 are also brought into contact with the inner wall surfaces 14b of the long sides of the frame body 14 to drive the second bars 54 in a direction in which the pressing force is increased. Further, in the state where the measurement value of the pressing force measured by the load measuring means 58 reaches the target value, further driving of the second bars 54 by the drive means 56 is stopped. In this manner, it is possible to maintain the state where the pressing force of the target value is also applied to the long sides of the frame body 14.

As a result, the pressing force capable of correcting the shape of the frame body 14 is applied to each of the sides of the frame body 14. In this manner, even in the case where strain has been generated in the frame body 14, it is possible to suitably correct the shape of the frame body 14. In this regard, as described above, the magnitude of the pressing force applied to the frame body 14 is maintained at the target value. Therefore, it is possible to avoid application of unnecessarily large pressing force to the frame body 14. Accordingly, it is possible to eliminate the concern that the frame body 14 is damaged at the time of correcting the shape of the frame body 14 using the shape correction apparatus 10.

Further, as described above, by applying the pressing force to the short sides and then to the long sides of the frame body 14, it is possible to reduce the operation errors of the pressing mechanism 42 in comparison with the case of simultaneously applying the pressing force to the four sides of the frame body 14, and improve the correction accuracy of correcting the shape of the frame body 14 easily.

In this regard, since the long sides of the frame body 14 are longer than the short sides thereof, the deformation amount in deformation of the long sides of the frame body 14 by correction tends to be large. The friction force generated between the second bars 54 and the long sides of the frame body 14 when the long sides are pressed by the second bars 54 to correct the shape of the long sides, tends to be larger than the friction force generated between the first bars 52 and the short sides of the frame body 14 when the short sides are pressed by the first bars 52 to correct the shape of the short sides.

Therefore, as described above, by firstly applying the pressing force to the short sides where the deformation amount is small, it is possible to deform the long sides easily since the friction force between the short sides and the first bars 52 is small. As a result, it becomes possible to correct the shape of the frame body 14 with a higher degree of accuracy by suitably deforming both of the short sides and the long sides into the target shapes.

Next, a maintaining step of maintaining the shape of the frame body 14 as corrected above is performed. Specifically, as shown in FIGS. 8A and 8B, the frame body 14 in the state of being applied with the above pressing force by the pressing mechanism 42 is held between the first holder 44 and the second holder 46 in the thickness direction of the frame body 14. At this time, the second holder 46 is stacked on the first holder 44 in a manner that the pins 48 protruding from the first holder 44 are inserted into the plurality of pin holes 50 formed in the second holder 46, respectively. In this manner, it is possible to position and fix the first holder 44 and the second holder 46 easily.

Figure 10:
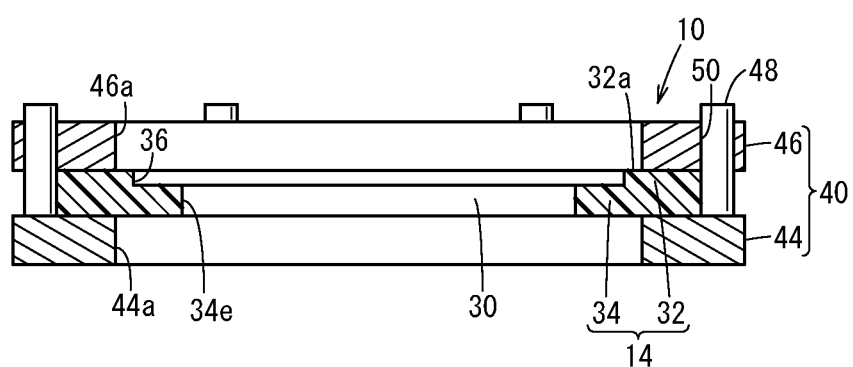
FIG. 10 is a cross sectional view taken along a line X-X indicated by arrows in FIG. 9.

Next, the first bars 52 and the second bars 54 are separated from the inner wall surfaces 14a, 14b of the frame body 14 by the drive means 56. Then, as shown in FIGS. 9 and 10, the pressing mechanism 42 is removed from the opening 30 of the frame body 14. Since the frame body 14 is held between the first holder 44 and the second holder 46, it is possible to suitably maintain the state where the shape is corrected even if the pressing force from the pressing mechanism 42 is not applied to the frame body 14 any more.

Figure 11:
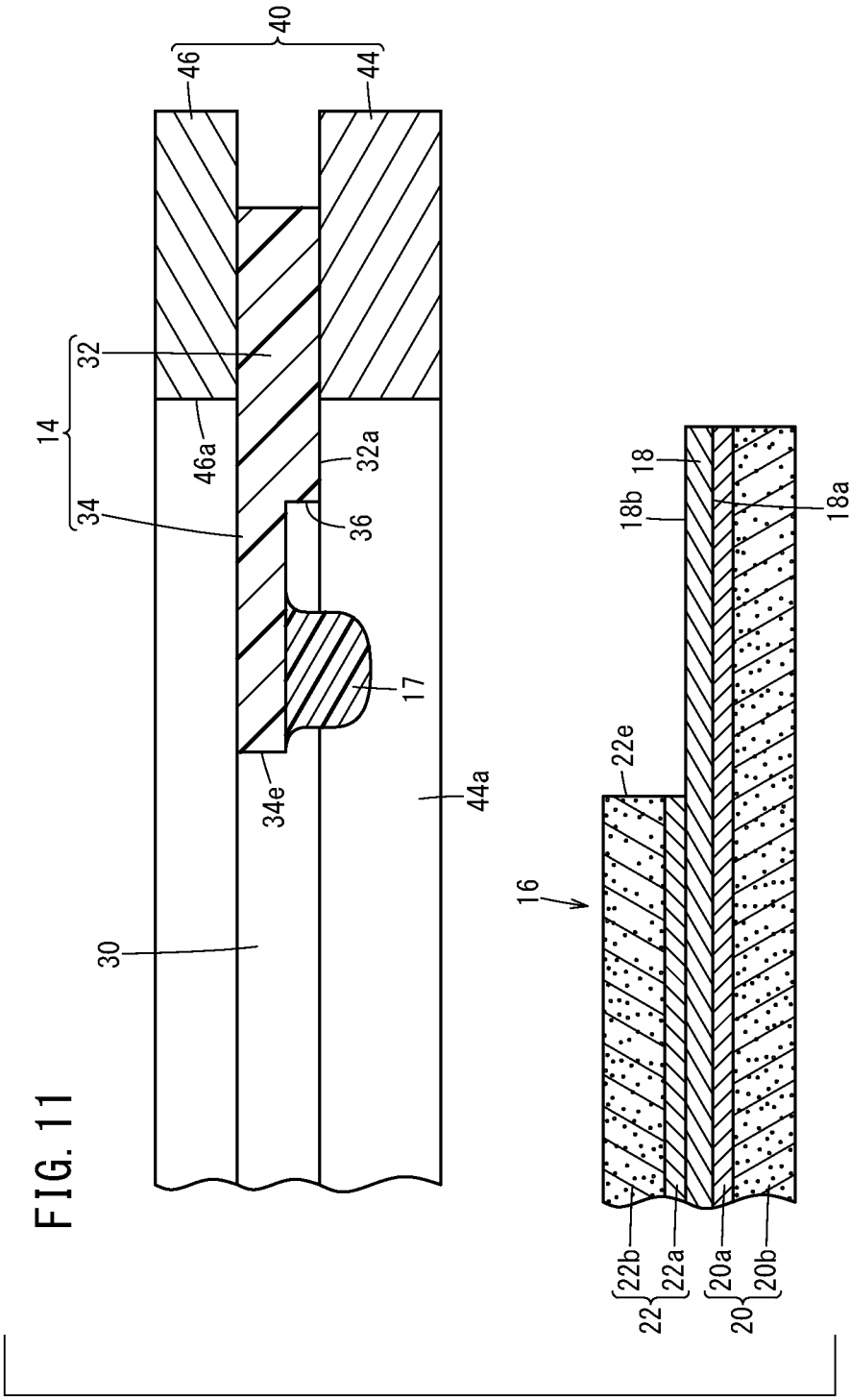
FIG. 11 is a cross sectional view showing a state where the frame body in FIG. 10 provided with adhesive and the membrane electrode assembly are positioned in alignment with each other.

Next, a joining step of joining the peripheral portion of the opening 30 of the frame body 14 exposed from the openings 44a, 46a of the stacked first holder 44 and the second holder 46 and the outer peripheral portion of the MEA 16 is performed. Specifically, as shown in FIG. 11, the adhesive 17 is coated in the step 36 of the peripheral portion of the opening 30 using a dispenser (not shown), for example. Then, in the state where the frame body 14 is held between the first holder 44 and the second holder 46, the frame body 14 is positioned in alignment with the MEA 16.

Figure 12:
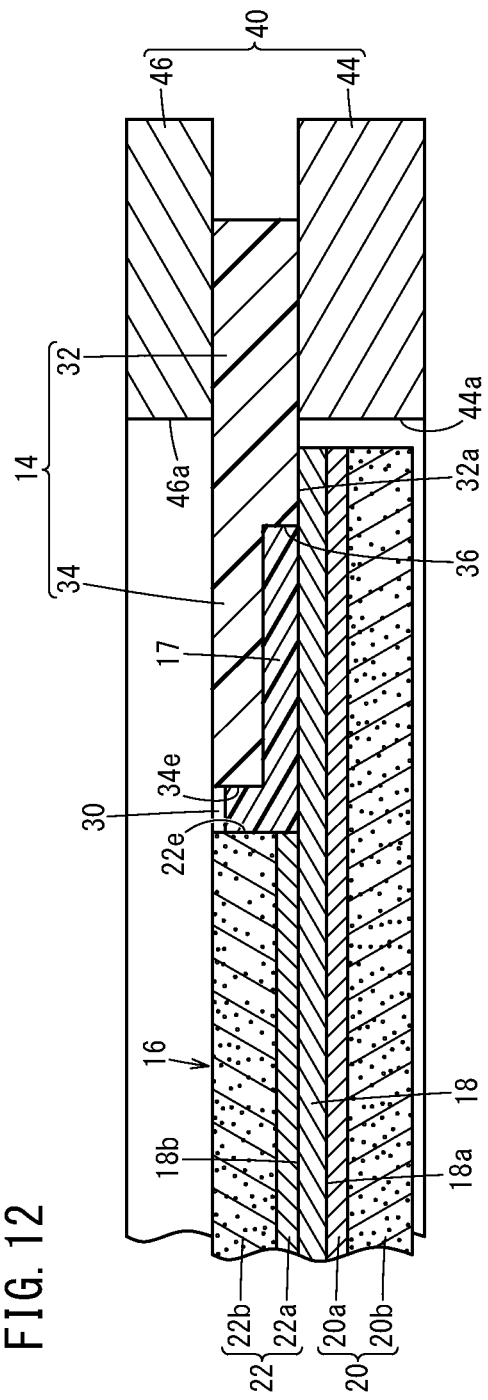
FIG. 12 is a cross sectional view showing s state where the frame body and the membrane electrode assembly in FIG. 11 are joined together.

Then, as shown in FIG. 12, the frame body 14 and the MEA 16 are brought into contact with each other and applied with the pressing force in the thickness direction. As a result, the adhesive 17 is spread inside the step 36, fills the space between the thin part 34 and the surface 18b, and enters the space between the end surface 34e of the thin part 34 and the end surface 22e of the cathode 22. After the frame body 14 and the MEA 16 are joined together through the adhesive 17, the first holder 44 and the second holder 46 are removed from the frame body 14. As a result, the resin frame equipped MEA 12 shown in FIG. 2 is obtained. That is, since the frame body 14 having the shape corrected suitably as described above can be joined to the MEA 16, it is possible to obtain the resin frame equipped MEA 12 having excellent dimensional accuracy.

The present invention is not limited to the above described embodiment. Various modifications may be made without departing from the gist of the present invention. For example, instead of the first bars 52 and the second bars 54, the pressing mechanism 42 may have first bars 152 and second bars 154 according to a modified embodiment shown in FIGS. 13 to 15.

Figure 13:
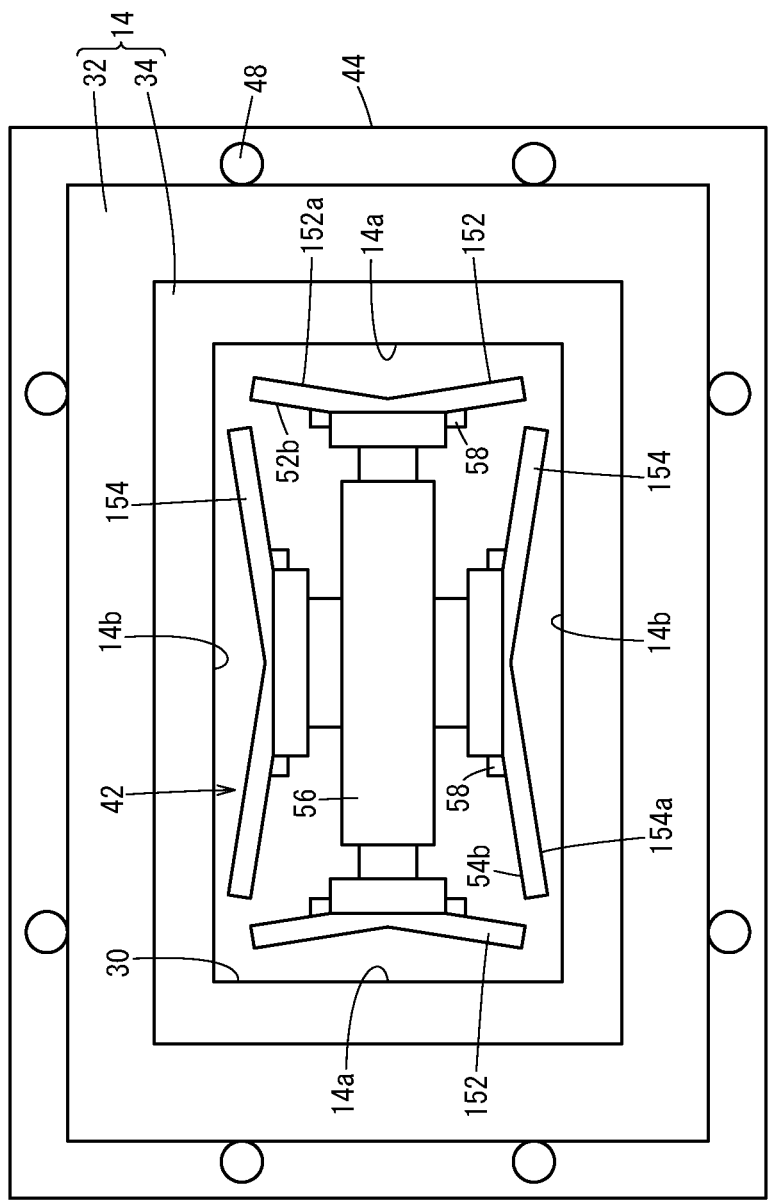
FIG. 13 is a plan view showing a state where a pressing mechanism having a bar according to a modified embodiment is set in the opening of the frame body in FIG. 4.

As shown in FIG. 13, the first bars 152 and the second bars 154 are different from the first bars 52 and the second bars 54 having a straight shape in that the first bars 152 and the second bars 154 have a bent shape when not in contact with the frame body 14. Specifically, in the state where the first bars 152 and the second bars 154 are not in contact with the frame body 14, each of the first bars 152 and the second bars 154 has a bent shape which becomes separated from the inner wall surfaces 14a, 14b of the frame body 14, from both ends toward the center. That is, each of the first bars 152 and the second bars 154 has a substantially V-shape on the side of contact surfaces 152a, 154a which contact the inner wall surfaces 14a, 14b of the frame body 14.

Figure 15:
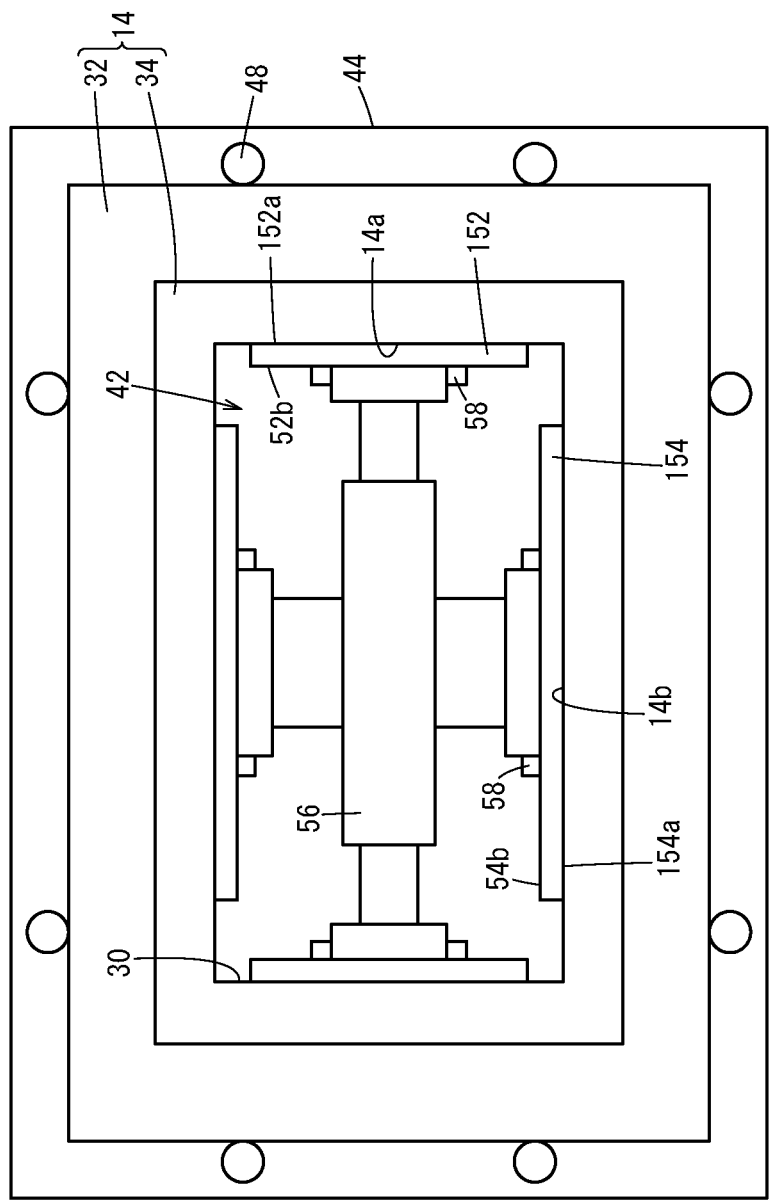
FIG. 15 is a plan view showing a state where a pressing force is applied also to the long sides of the frame body by the pressing mechanism in FIG. 13.

Further, each of the first bars 152 and the second bars 154 is made of flexible material, and deformable by contact with the frame body 14. As shown in FIG. 15, when the measurement value of the pressing force reaches the target value, each of the first bars 152 and the second bars 154 has a straight shape along the inner wall surfaces 14a, 14b of the frame body 14.

It should be noted that, in order to make the first bars 152 and the second bars 154 deformable, for example, when the measurement value of the pressing force reaches the target value, the deformation amount in deformation of the first bars 152 and the second bars 154 should be calculated from the following calculation equation (1) of a cantilever, and the bending shape should be determined in consideration of the deformation amount in advance.

$$\delta = PL^3/3IE \tag{1}$$

where δ is the deformation amount of the first bars 152 or the second bars 154, P denotes the target value of the pressing force, L denotes the length, I denotes the second moment of area, and E denotes the Young's modulus.

Also in the case of the shape correction apparatus 10 in which the pressing mechanism 42 includes the first bars 152 and the second bars 154, basically, it is possible to produce the resin frame equipped MEA 12 in the same manner as in the case of the shape correction apparatus 10 in which the pressing mechanism 42 includes the first bars 52 and the second bars 54. Specifically, as shown in FIG. 13, the pressing mechanism 42 is disposed inside the opening 30 of the frame body 14 placed in the first holder 44. At this time, in the pressing mechanism 42, since the first bars 152 and the second bars 154 are spaced from the inner wall surfaces 14a, 14b of the frame body 14, respectively, by the drive means 56, all of the first bars 152 and the second bars 154 have a bent shape.

Figure 14:
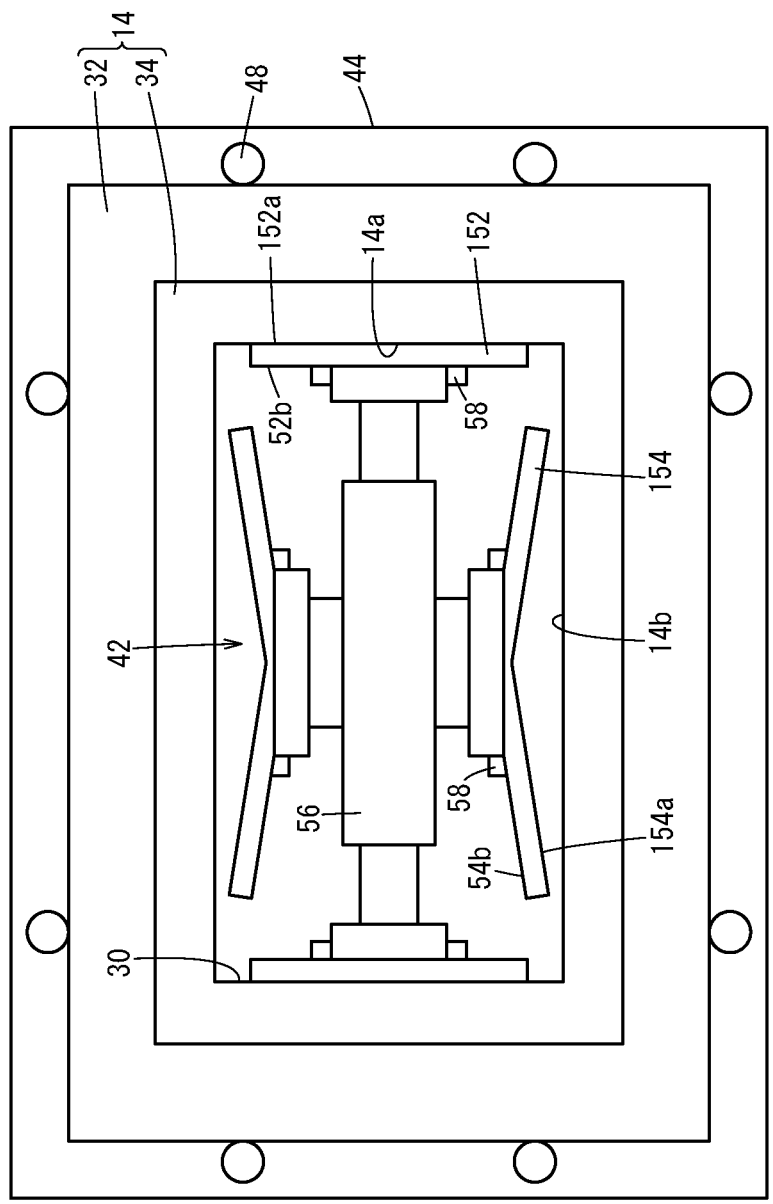
FIG. 14 is a plan view showing a state where the pressing force is applied to the short sides of the frame body by the pressing mechanism in FIG. 13.

Next, as shown in FIG. 14, in order to perform the correcting step, the drive means 56 brings the pair of first bars 152 into contact with the inner wall surfaces 14a of the short sides of the frame body 14 to drive the first bars 152 in a direction in which the pressing force is increased. At this time, as described above, since the first bars 152 having the bent shape are deformed by contact with the inner wall surfaces 14a, it is possible to highly accurately measure the deformation amount of the first bars 152 by the load measuring means 58.

Then, in the state where the measurement value of the pressing force determined from the deformation amount by the load measuring means 58 reaches the target value, and the first bars 152 are deformed into a straight shape along the inner wall surfaces 14a, further driving of the first bars 152 by the drive means 56 is stopped. In this manner, it is possible to maintain the state where the pressing force having the target value is applied to the short sides of the frame body 14.

Next, as shown in FIG. 15, the drive means 56 also brings the pair of second bars 154 into contact with the inner wall surfaces 14b of the long sides of the frame body 14 to drive the second bars 154 in a direction in which the pressing force is increased. At this time, as in the case of the first bars 152, the second bars 154 having a bent shape are deformed by contact with the inner wall surfaces 14b. Therefore, it is possible to highly accurately measure the deformation amount of the second bars 154 by the load measuring means 58.

Then, in the state where the measurement value of the pressing force determined from the deformation amount by the load measuring means 58 reaches the target value, and the second bars 154 are deformed into a straight shape along the inner wall surfaces 14b, further driving of the second bars 154 by the drive means 56 is stopped. In this manner, it is possible to maintain the state where the pressing force of the target value is applied also to the long sides of the frame body 14.

As described above, by forming the first bars 152 and the second bars 154 in a bent shape, the shape of the first bars 152 and the second bars 154 after deforming by contact with the frame body 14 can be changed to the target shape of the frame body 14 (straight shape). Therefore, also in the case of applying the pressing force to the frame body 14 while deforming the first bars 152 and the second bars 154 in order to highly accurately measure the magnitude of the pressing force, it is possible to highly accurately correct the shape of the frame body 14 which is in contact with the first bars 152 and the second bars 154 after deformation. Moreover, it is possible to obtain the resin frame equipped MEA 12 having excellent dimensional accuracy.

Figure 16:
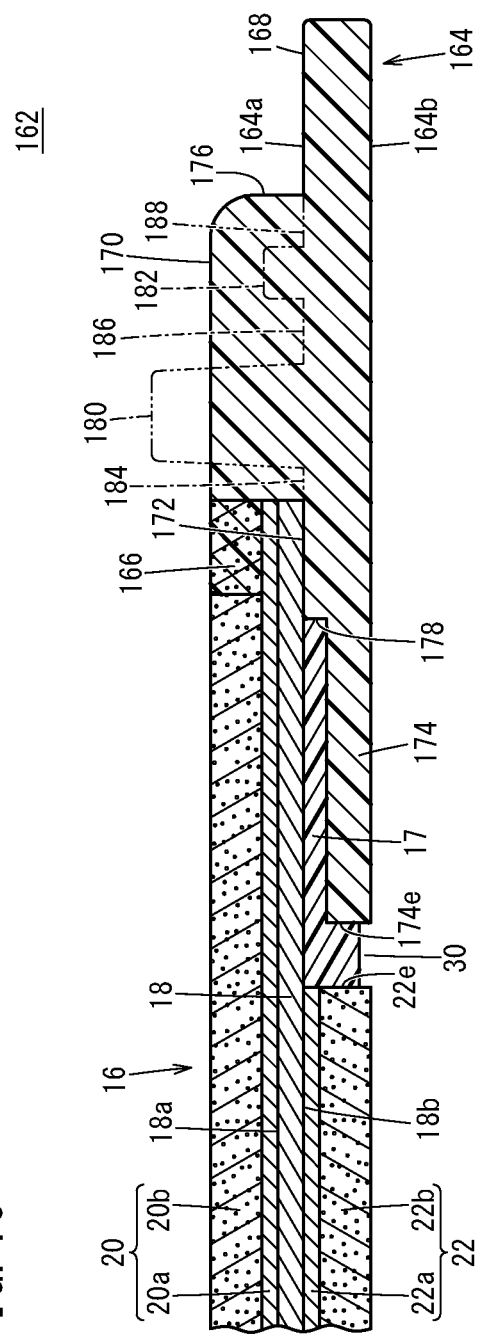
FIG. 16 is a partial cross sectional view showing a fuel cell resin frame equipped membrane electrode assembly obtained by applying a method of producing the fuel cell resin frame equipped membrane electrode assembly according to a second embodiment of the present invention.

Next, with reference to FIGS. 16 to 23, a shape correction apparatus 160 (see FIGS. 18 to 21) according to a second embodiment and a method of producing a resin frame equipped MEA 162 (see FIG. 16) according to the second embodiment using the shape correction apparatus 160 will be described. As shown in FIG. 16, the resin frame equipped MEA 162 has the same structure as the resin frame equipped MEA 12 according to the first embodiment except that the resin frame equipped MEA 162 includes a frame body 164 instead of the frame body 14, and the frame body 164 is joined to the outer periphery of the MEA 16 through the adhesive 17 and an impregnation joint portion 166.

The frame body 164 may be made of the same material as the above frame body 14. Further, the shape of the frame body 164 after being joined to the MEA 16 is changed partially from the shape of the frame body 164 before being joined to the MEA 16. In FIG. 16, a portion after the shape change of the frame body 164 is denoted by a solid line, and a portion before the shape change of the frame body 164 is denoted by a two dot chain line.

The frame body 164, the shape of which has been changed by being joined to the MEA 16, includes an outer peripheral portion 168, a molten and solidified portion 170, a stack portion 172, and an inner peripheral portion 174. The outer peripheral portion 168, the molten and solidified portion 170, the stack portion 172, and the inner peripheral portion 174 are arranged in this order, from the outer peripheral end to the inside of the frame body 164. On one surface 164a side of the frame body 164, the molten and solidified portion 170 protrudes in the thickness direction of the frame body 164, and therefore has a large thickness in comparison with the other portions of the frame body 164. A step 176 is formed between the molten and solidified portion 170 and the outer peripheral portion 168. Further, the thickness of the inner peripheral portion 174 is smaller than the thickness of the stack portion 172 of the frame body 164, and a step 178 is formed between the inner peripheral portion 174 and the stack portion 172.

The surface 18b side of the solid polymer electrolyte membrane 18 is stacked on the stack portion 172 on the surface 164a of the frame body 164. When the solid polymer electrolyte membrane 18 and the stack portion 172 are stacked together, the adhesive 17 is provided in a space formed between the inner peripheral portion 174 and the surface 18b, by the step 178. Thus, the outer peripheral portion of the MEA 16 on the cathode 22 side and the frame body 164 are joined together.

The outer peripheral portion of the MEA 16 on the anode 20 side is joined to the frame body 164 through the impregnation joint portion 166. As described later, the impregnation joint portion 166 and the molten and solidified portion 170 are formed by melting/deforming an impregnation protrusion 180.

Next, the frame body 164 before joined to the MEA 16, i.e., before the shape change thereof will be described with reference to FIG. 17. The frame body 164 before shape change includes the impregnation protrusion 180 and a frame body side engagement portion 182, instead of the molten and solidified portion 170. Each of the impregnation protrusion 180 and the frame body side engagement portion 182 is a ridge protruding in the thickness direction of the frame body 164, on the surface 164a side of the frame body 164, and is provided between the outer peripheral portion 168 and the stack portion 172. The protruding length of the impregnation protrusion 180 and the frame body side engagement portion 182 is larger than the thickness of the outer peripheral portion 168 and the stack portion 172.

The impregnation protrusion 180 is provided more closely to the stack portion 172 than the frame body side engagement portion 182, and has a protruding length larger than the protruding length of the frame body side engagement portion 182. As shown in FIG. 16, the thickness of the molten and solidified portion 170 is smaller than the protruding length of the impregnation protrusion 180, and larger than the protruding length of the frame body side engagement portion 182.

As shown in FIG. 16, on the surface 164a side of the frame body 164, a first covering portion 184 is provided between the stack portion 172 and the impregnation protrusion 180, and a second covering portion 186 is provided between the impregnation protrusion 180 and the frame body side engagement portion 182, and a third covering portion 188 is provided between the frame body side engagement portion 182 and the outer peripheral portion 168. After the impregnation protrusion 180 is molten and deformed to form the molten and solidified portion 170, the first covering portion 184, the second covering portion 186, the third covering portion 188, and the frame body side engagement portion 182 are covered with the molten and solidified portion 170.

The impregnation joint portion 166 is formed integrally with the molten and solidified portion 170 by solidifying the molten resin of the impregnation protrusion 180 in the state where the outer peripheral portion of the first gas diffusion layer 20b of the anode 20 is impregnated with the molten resin.

Figure 17:
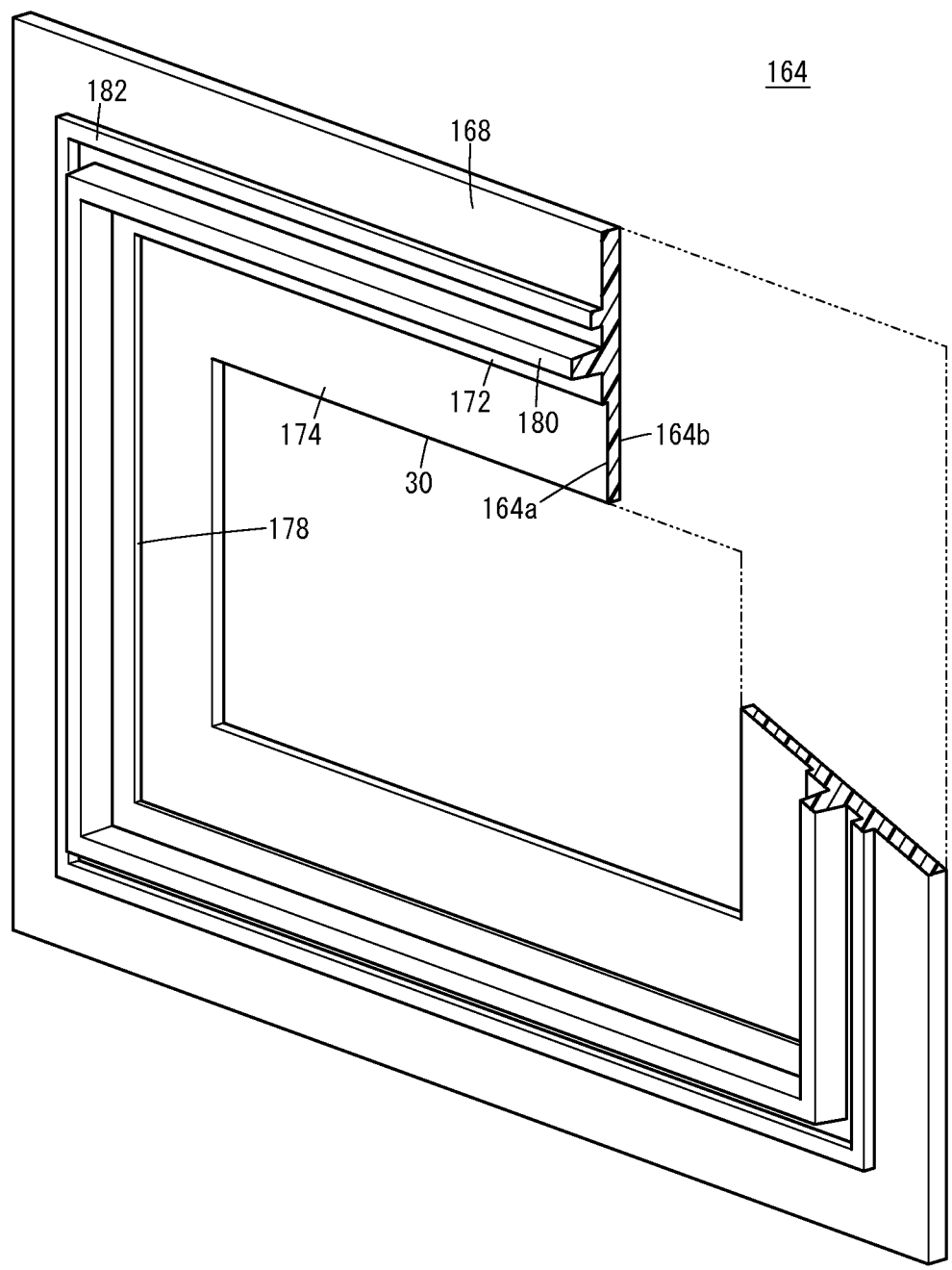
FIG. 17 is a partial cross sectional perspective view showing a frame body of the fuel cell resin frame equipped membrane electrode assembly in FIG. 16, before the frame body is joined to the membrane electrode assembly.

In the second embodiment, as shown in FIG. 17, the impregnation protrusion 180 and the frame body side engagement portion 182 are ridges around the peripheral portion of the opening 30 of the frame body 164, i.e., ridges extending along both of the long sides and the short sides of the frame body 164. The molten and solidified portion 170 formed by melting/deforming the impregnation protrusion 180 is formed around the peripheral portion of the opening 30 of the frame body 164, and the impregnation joint portion 166 is formed around the outer periphery of the anode 20.

Next, the shape correction apparatus 160 according to the second embodiment will be described with reference to FIGS. 18 to 21. The shape correction apparatus 160 has the same structure as the shape correction apparatus 10 according to the first embodiment except that a holder side engagement portion 190 is provided on a surface 44b of the first holder 44 where the frame body 164 is placed, and an inclined portion 44c is provided in an inner peripheral end surface 45 of the first holder 44. The inclined portion 44c is not an essential constituent element and may not be provided in the first holder 44.

Figure 18:
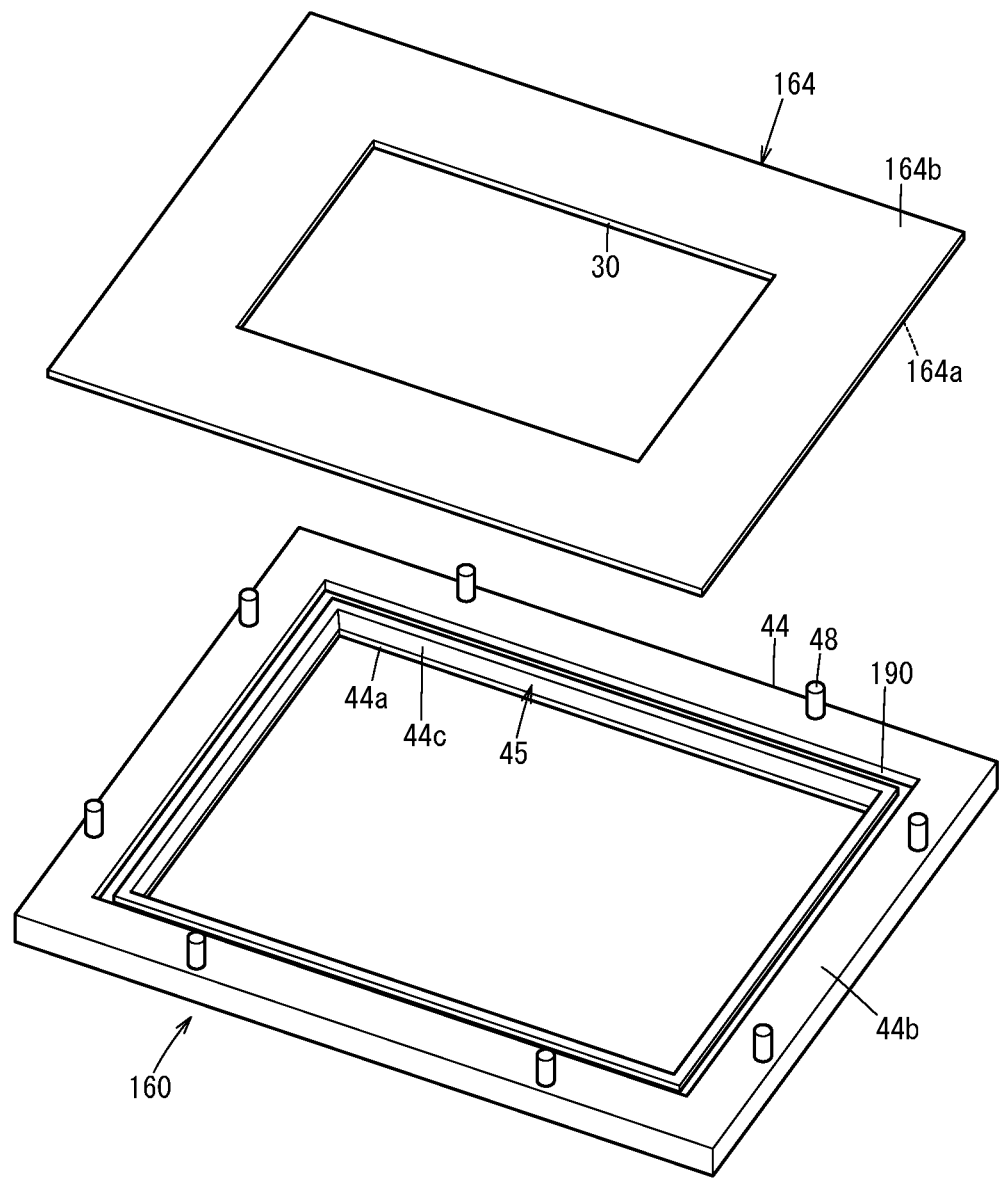
FIG. 18 is a perspective view showing a first holder of a shape correction apparatus for a frame body according to a second embodiment of the present invention, and the frame body in FIG. 17 before being placed on the first holder.
Figure 19:
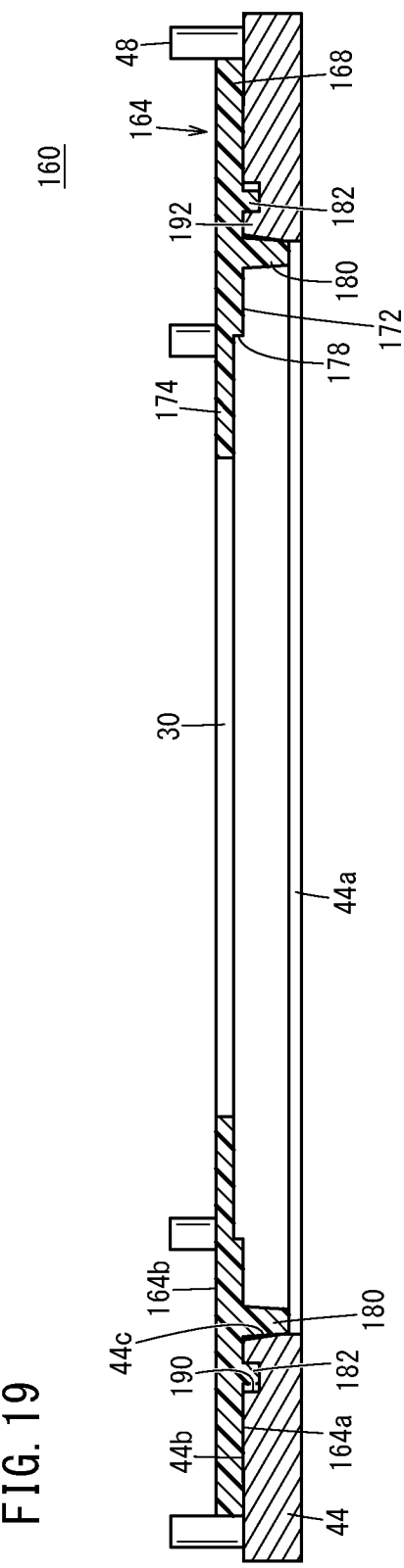
FIG. 19 is a cross sectional view showing a state where the frame body is placed on the first holder in FIG. 18.

As shown in FIG. 19, etc., the holder side engagement portion 190 is in the form of a groove capable of accommodating the frame body side engagement portion 182 when the surface 164a side of the frame body 164 is stacked on the first holder 44. The frame body side engagement portion 182 is inserted into the holder side engagement portion 190, whereby the holder side engagement portion 190 and the frame body side engagement portion 182 are brought into engagement with each other. In the second embodiment, the frame body side engagement portion 182 is formed around the peripheral portion of the opening 44a of the first holder 44 (see FIG. 18). Stated otherwise, the frame body side engagement portion 182 extends along both of the long sides and the short sides of the frame body 164 stacked on the first holder 44.

Figure 20:
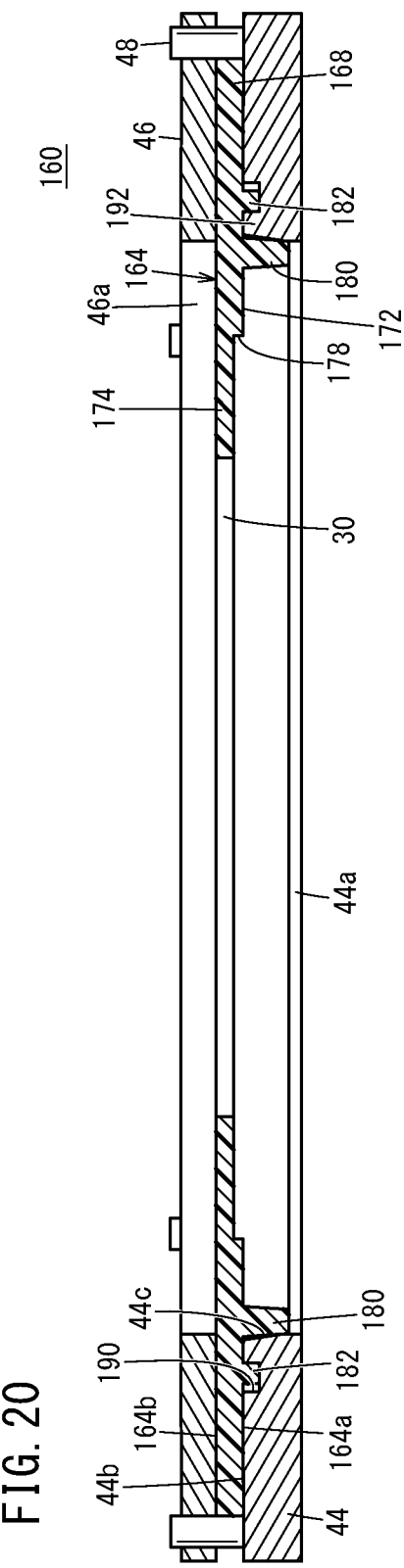
FIG. 20 is a cross sectional view showing a state where a second holder is stacked on the first holder in FIG. 19 to hold the frame body, and thereafter, the pressing mechanism is removed from the frame body.

As shown in FIG. 20, by stacking the second holder 46 on a back surface 164b side of the surface 164a of the frame body 164, it is possible to hold the frame body 164 by the frame body holder 40 in the state where the holder side engagement portion 190 and the frame body side engagement portion 182 are engaged with each other. The frame body 164 held by the frame body holder 40 in this manner is restricted from moving relatively at least toward the inner peripheral side of the frame body holder 40.

Figure 21:
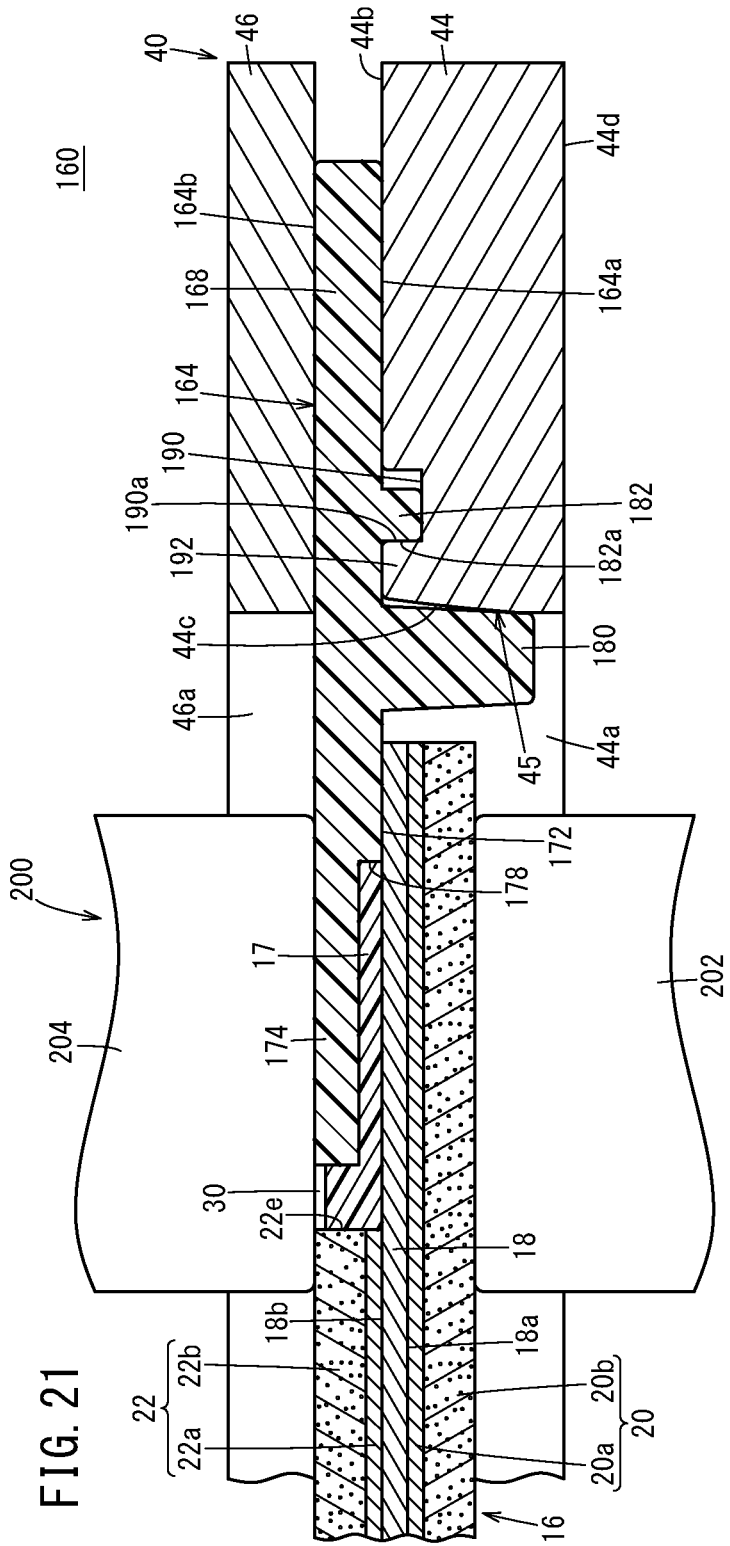
FIG. 21 is a view showing a step of joining the frame body in FIG. 20 and the membrane electrode assembly, using a pressurizing apparatus.

In the embodiment of the present invention, as shown in FIG. 21, an inner wall surface 190a of the inner peripheral side of the holder side engagement portion 190 and a side surface 182a of the inner peripheral side of the frame body side engagement portion 182 are brought into contact with each other. As a result, relative movement of the frame body 164 toward the inner peripheral side of the frame body holder 40 is prevented.

The inclined portion 44c is inclined to get closer from the inner peripheral side to the outer peripheral side of the first holder 44, from a surface 44d side to the surface 44b side of the first holder 44. Therefore, an inner peripheral portion 192 between the inner wall surface 190a of the holder side engagement portion 190 and the inclined portion 44c of the first holder 44 is narrower on the surface 44b side than on the surface 44d side.

The shape correction apparatus 160 according to the second embodiment basically has the above structure. Next, a method of producing the resin frame equipped MEA 162 using the shape correction apparatus 160 will be described.

Firstly, as shown in FIGS. 18 and 19, the surface 164a side of the frame body 164 is stacked on the surface 44b side of the first holder 44. As a result, as shown in FIG. 19, a portion of the frame body 164 on the outer peripheral side of the impregnation protrusion 180 is stacked on the first holder 44, and the end surface on the outer peripheral side of the frame body 164 is brought in contact with the pins 48.

At this time, the frame body side engagement portion 182 of the frame body 164 is inserted into the holder side engagement portion 190 of the first holder 44, whereby the holder side engagement portion 190 and the frame body side engagement portion 182 are brought into engagement with each other. As described above, by bringing the holder side engagement portion 190 and the frame body side engagement portion 182 into engagement with each other, it becomes possible to easily position the first holder 44 and the frame body 164. Further, since the inclined portion 44c is provided in the inner peripheral end surface 45 of the first holder 44, it is possible to avoid interference between the impregnation protrusion 180 and the inner peripheral portion 192 easily.

Next, a correcting step of correcting the shape of the frame body 164 is performed by placing the pressing mechanism 42 (see FIG. 5, etc.) inside the opening 30 of the frame body 164, and applying the pressing force oriented from the inside to the outside of the opening 30 to each of the sides of the frame body 164 by the pressing mechanism 42. Next, a maintaining step of maintaining the shape of the frame body 164 corrected by the pressing mechanism 42, by holding the frame body 164 between the first holder 44 and the second holder 46 is performed. Each of the correcting step and the maintaining step can be performed in the same manner as in the case of the correcting step and the maintaining step in the method of producing the resin frame equipped MEA 12 according to the first embodiment, and therefore, the specific description thereof will be omitted.

Next, the pressing mechanism 42 is removed from the opening 30 of the frame body 164 (see FIG. 20). Even after the pressing mechanism 42 is removed, since the frame body 164 is held between the first holder 44 and the second holder 46, the corrected shape of the frame body 164 is maintained. In the frame body 164 held by the frame body holder 40 in this manner, the holder side engagement portion 190 and the frame body side engagement portion 182 are engaged with each other. Further, a friction force is generated in the contact portion between the frame body holder 40 and the frame body 164. Further, the impregnation protrusion 180 is provided substantially along the inner peripheral end surface 45 of the first holder 44. Accordingly, relative movement of the frame body 164 with respect to the frame body holder 40 is restricted.

Next, a joining step of joining the peripheral portion of the opening 30 of the frame body 164 exposed from the openings 44a, 46a of the first holder 44 and the second holder 46, and an outer peripheral portion of the MEA 16 is performed. Although the joining step can be performed basically in the same manner as the joining step in the method of producing the resin frame equipped MEA 12 according to the first embodiment, for example, as shown in FIG. 21, the joining step may be performed by applying the pressure force to the frame body 164 and the MEA 16 using a pressurizing apparatus 200. The pressurizing apparatus 200 includes a lower die 202 and an upper die 204.

The peripheral portion of the opening 30 of the frame body 164 and the outer peripheral portion of the MEA 16 stacked through the adhesive 17 are held between the lower die 202 and the upper die 204, and applied with the pressure force in the thickness direction (stacking direction). In this manner, the adhesive 17 is spread between the inner peripheral portion 174 of the frame body 164 and the surface 18b of the solid polymer electrolyte membrane 18 to join the frame body 164 and the cathode 22 side of the MEA 16 together. For example, in the case where it is necessary to heat the adhesive 17, at least one of the lower die 202 and the upper die 204 may be heated using a heater (not shown).

In the case of applying a pressure force using the pressurizing apparatus 200 as described above, the frame body 164 may be pulled toward the inner peripheral side of the frame body holder 40, or deformed elastically through the lower die 202 and the upper die 204. That is, against the force of holding the frame body 164 by the frame body holder 40, a force of moving the frame body 164 toward the inner peripheral side of the frame body holder 40 may be generated. Also in this case, as described above, by engagement between the holder side engagement portion 190 and the frame body side engagement portion 182, for example, it is possible to restrict relative movement between the frame body holder 40 and the frame body 164.

Therefore, in the method of producing the resin frame equipped MEA 162 according to the second embodiment, it becomes possible to perform the joining step in the state where the shape of the frame body 164 corrected by the pressing mechanism 42 is further suitably maintained by the frame body holder 40.

Figure 22:
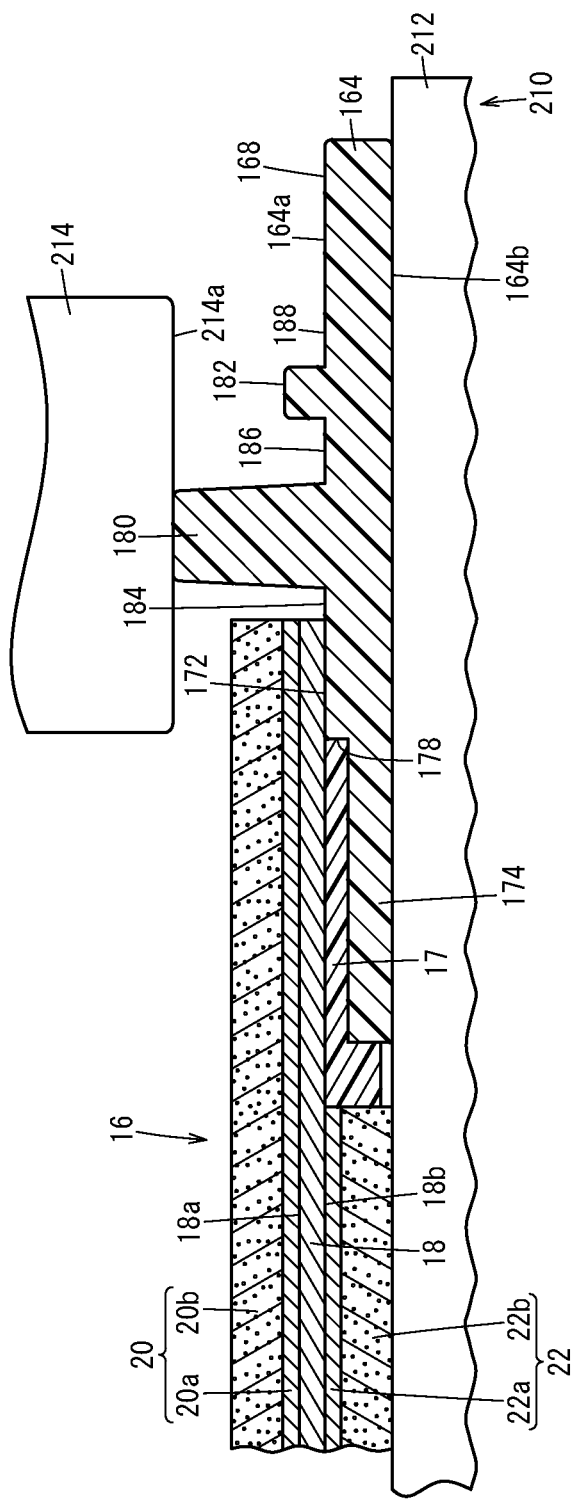
FIG. 22 is a view showing a state where a movable die of a joining apparatus is brought into contact with an impregnation protrusion.
Figure 23:
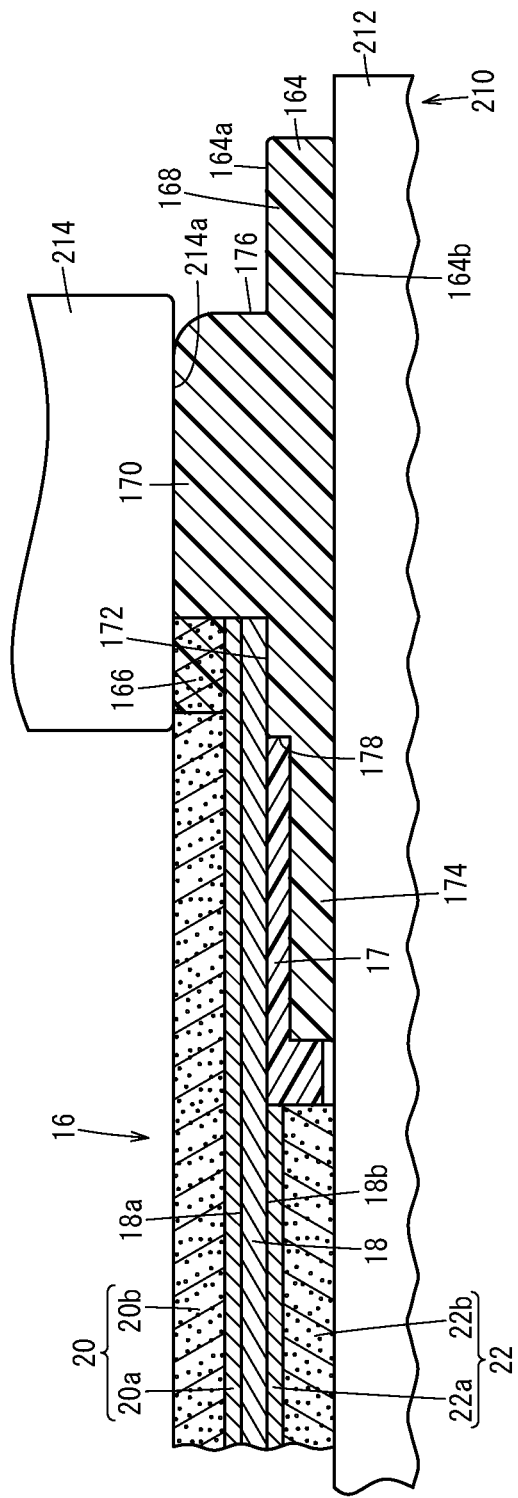
FIG. 23 is a view showing a state where the impregnation protrusion in FIG. 22 is molten and deformed to form an impregnation joint portion and a molten and solidified portion.

Next, holding of the frame body 164 by the frame body holder 40 is released. Then, as shown in FIGS. 22 and 23, an impregnation joining step is performed using a joining apparatus 210. The joining apparatus 210 includes a base frame 212 on which the frame body 164 and the MEA 16 are placed, and a movable die 214 movable closer to and away from the base frame 212. For example, the movable die 214 has a frame shape, and the temperature of the movable die 214 can be raised by heating the movable die 214 using a heater (not shown), etc.

In the impregnation joining step using the above joining apparatus 210, firstly, as shown in FIG. 22, the frame body 164 and the MEA 16 joined together by the adhesive 17 are placed on the base frame 212. At this time, the surface 164a side of the frame body 164 is positioned so as to face the movable die 214 side. Further, by lowering the movable die 214 in the state of being heated to a predetermined temperature, the impregnation protrusion 180 is heated and pressurized.

As a result, as shown in FIG. 23, the molten resin of the molten impregnation protrusion 180 flows so as to spread over a heating surface 214a of the movable die 214. Some of the molten resin which flowed toward the inner peripheral side of the movable die 214, i.e., toward the MEA 16 side covers the first covering portion 184 (see FIG. 22), and partially enters pores of the outer peripheral portion of the first gas diffusion layer 20b. On the other hand, some of the molten resin which flowed toward the outer peripheral side of the movable die 214, i.e., toward the outer peripheral portion 168 side of the frame body 164 covers the second covering portion 186, and moves beyond the frame body side engagement portion 182 to cover the third covering portion 188 (see FIG. 22).

As described above, the molten resin moves beyond the frame body side engagement portion 182. Thus, it is possible to restrict the molten resin from unnecessarily flowing toward the outer peripheral side of the frame body 164. That is, in the method of producing the resin frame equipped MEA 162 according to the second embodiment, the frame body side engagement portion 182 is a bank provided in the frame body 164 beforehand, for restricting the flow of the molten resin. Further, the holder side engagement portion 190 is provided utilizing an avoidance groove provided in the first holder 44 beforehand, so as to avoid interference between the frame body side engagement portion 182 and the first holder 44. Specifically, the holder side engagement portion 190 is formed by adjusting the shape of the avoidance groove, so that the relative movement of the frame body 164 with respect to the frame body holder 40 can be restricted when the holder side engagement portion 190 and the frame body side engagement portion 182 are engaged with each other.

The impregnation joint portion 166 is formed by solidification of the molten resin which entered the pores of the outer peripheral portion of the first gas diffusion layer 20b, and the molten and solidified portion 170 is formed by solidification of the remaining molten resin. In this manner, the frame body 164 and the anode 20 side of the MEA 16 are joined together. As a result, the frame body 164 having the shape corrected suitably as described above and both surfaces of the MEA 16 are joined together to obtain the resin frame equipped MEA 162 (see FIG. 16) having excellent dimensional accuracy.

As described above, in the method of producing the resin frame equipped MEA 162 according to the second embodiment, the bank provided in the frame body 164 beforehand is utilized as the frame body side engagement portion 182 without being modified, and the shape of the avoidance groove provided in the first holder 44 is adjusted to utilize the avoidance groove as the holder side engagement portion 190. By utilizing the bank and the avoidance groove of the existing structure, it is possible to restrict relative movement of the frame body 164 toward the inner peripheral side of the frame body holder 40 easily at low cost.

In particular, by utilizing the frame body side engagement portion 182 as it is, the above operation and advantages can be obtained without changing the shape of the constituent elements of the resin frame equipped MEA 162 as a product. It should be noted that the shape of the bank may be adjusted to form the frame body side engagement portion 182, and the avoidance groove may be utilized as the holder side engagement portion 190 without being modified.

Further, as described above, the frame body side engagement portion 182 as the bank is eventually embedded in the molten and solidified portion 170. Therefore, even if deformation, etc. occurs in the frame body side engagement portion 182 by the load applied during engagement with the holder side engagement portion 190, there is no concern that the dimensional accuracy or the quality of the resin frame equipped MEA 162 is affected. Therefore, it is possible to effectively improve the dimensional accuracy of the resin frame equipped MEA 162 in simple steps.

In the second embodiment, the bank is used as the frame body side engagement portion 182, and the avoidance groove is used as the holder side engagement portion 190. However, the present invention is not limited in these respects. A holder side engagement portion (not shown) may be provided in the first holder 44 separately from the avoidance groove in a manner that the holder side engagement portion can be engaged with a frame body side engagement portion (not shown) provided in the frame body 164 separately from the bank. Further, the frame body side engagement portion 182 may be provided in the frame body 14 which does not have the bank, and the holder side engagement portion 190 may be provided in the first holder 44 which does not have the avoidance groove.

In the shape correction apparatus 160 according to the second embodiment, the frame body side engagement portion 182 is a protrusion protruding in the thickness direction of the frame body 164 and the holder side engagement portion 190 is a recess capable of accommodating the frame body side engagement portion 182. However, as described above, in the case where the bank and the avoidance groove are not used as the frame body side engagement portion 182 and the holder side engagement portion 190, the frame body side engagement portion 182 may be formed as a recess, and the holder side engagement portion 190 may be formed as a protrusion.

As described above, by forming the frame body side engagement portion 182 and the holder side engagement portion 190 as the recess and the protrusion which can be engaged with each other, the structure of the frame body side engagement portion 182 and the holder side engagement portion 190 can be made simple. Further, when the frame body 164 is held by the frame body holder 40, the frame body side engagement portion 182 and the holder side engagement portion 190 can be easily engaged with each other.

In the shape correction apparatus 160 according to the second embodiment, the holder side engagement portion 190 is in the form of a groove extending along both of the long sides and the short sides of the frame body 164 when the frame body 164 is held by the frame body holder 40. In this case, since the holder side engagement portion 190 and the frame body side engagement portion 182 can be firmly engaged with each other, it becomes possible to maintain the shape of the frame body 164 by the frame body holder 40 suitably.

However, the holder side engagement portion 190 may be in the form of a groove extending along at least either the long sides or the short sides of the frame body 164. Further, the holder side engagement portion 190 is not limited to be in the form of the groove, and one or a plurality of the holder side engagement portions 190 may be provided intermittently along at least either the long sides or the short sides of the frame body 164. Further, the holder side engagement portion 190 may be provided for the frame body holder 40, partially at positions facing four corners of the peripheral portion of the opening 30 of the frame body 164, or positions facing substantially centers of the sides of the frame body 164 in the length direction.

In the case where the holder side engagement portion 190 is provided in the frame body holder 40 at a position facing the long side of the frame body 164, although the long sides are longer than the short sides of the frame body 164 and tend to be deformed easily, it is possible to suppress relative movement of the long sides with respect to the frame body holder 40. Therefore, for example, in comparison with the case where the holder side engagement portion 190 is provided only at a position facing the short sides of the frame body 164, it becomes possible to maintain the shape of the frame body 164 effectively.

In the shape correction apparatuses 10, 160 according to the first embodiment and the second embodiment, the pressing mechanism 42 has the first bars 52, 152 and the second bars 54, 154 which contact the inner wall surfaces 14a, 14b, 164a, 164b of the respective sides of the frame bodies 14, 164 and apply the pressing force thereto. In this case, with simple structure, it is possible to apply the pressing force to the frame body 14, 164 effectively. However, the pressing mechanism 42 may have one or a plurality of contact parts which partially contact each side of the frame body 14, 164 and apply the pressing force thereto, instead of the first bars 52, 152 and the second bars 54, 154 extending along the respective sides of the frame body 14, 164.

The above shape correction apparatus 10, 160 applies the pressing force to the short sides, and then, the long sides of the frame body 14, 164. However, the present invention is not limited in this respect. For example, the pressing force may be simultaneously applied to the four sides of the frame body 14, 164. Further, in the case where the friction force generated between the frame body 14, 164, and the first bars 52, 152 and the second bars 54, 154 is small, the pressing force may be applied to the long sides, and then, the short sides of the frame body 14, 164.

The above shape correction apparatus 10, 160 includes the load measuring means 58, and in the state where the measurement value of the pressing force measured by the load measuring means 58 reaches the target value, driving of the bars 52, 54, 152, 154 by the drive means 56 is stopped. However, the present invention is not limited in this respect. The shape correction apparatus 10 may not include the load measuring means 58. In this case, for example, the bars 52, 54, 152, 154 may be moved by the drive means 56 by a predetermined distance in a manner that the pressing force having the target magnitude is applied to the long sides and the short sides of the frame body 14.

In the above shape correction apparatus 10, 160, the plurality of pins 48 are provided in the first holder 44, and the plurality of pin holes 50 are provided in the second holder 46. Alternatively, the pins 48 and the pin holes 50 may not be provided in the first holder 44 and the second holder 46, respectively.

What is claim is:

1. A method of producing a fuel cell resin frame equipped membrane electrode assembly,
the method comprising:
a molding step of molding, using a die, a resin frame body having a rectangular opening at substantially a center of the frame body;
a correcting step of correcting a shape of the frame body by applying a pressing force oriented from an inside to an outside of the opening by a pressing mechanism;
a maintaining step of maintaining the corrected shape of the frame body by a frame body holder configured to hold an outer peripheral side of the frame body in a thickness direction; and
a joining step of, in a state where the frame body is held by the frame body holder, joining a peripheral portion of the opening and an outer peripheral portion of a membrane,
wherein in the correcting step, firstly, the pressing force is applied to only a short side of the frame body, and then the pressing force is applied also to a long side the frame body.

2. A method of producing a fuel cell resin frame equipped membrane electrode assembly,
the method comprising:
a molding step of molding, using a die, a resin frame body having a rectangular opening at substantially a center of the frame body;
a correcting step of correcting a shape of the frame body by applying a pressing force oriented from an inside to an outside of the opening by a pressing mechanism;

a maintaining step of maintaining the corrected shape of the frame body by a frame body holder configured to hold an outer peripheral side of the frame body in a thickness direction; and a joining step of, in a state where the frame body is held by the frame body holder, joining a peripheral portion of the opening and an outer peripheral portion of a membrane, wherein in the correcting step, firstly, the pressing force is applied to any one of a short side and a long side of the frame body, and then the pressing force is applied also to another of the short side and the long side of the frame body, the maintaining step is performed while the frame body is held by the frame body holder in a manner that a holder side engagement portion provided for the frame body holder is engaged with a frame body side engagement portion provided for the frame body, to perform the joining step in a state where relative movement of the frame body at least toward an inner peripheral side of the frame body holder is restricted, in the maintaining step, the frame body side engagement portion in a form of a protrusion is engaged with the holder side engagement portion in a form of a recess, the method further comprising an impregnation joining step of, after the joining step, releasing holding of the frame body by the frame body holder, melting an impregnation protrusion provided in the frame body on a side closer to the opening than the frame body side engagement portion to form molten resin, and impregnating the outer peripheral portion of the membrane electrode assembly with the molten resin to form an impregnation joint portion while restricting flow of the molten resin toward the outer peripheral side of the frame body by the frame body side engagement portion.

* * * * *